United States Patent [19]

Tindall

[11] Patent Number: 4,839,745
[45] Date of Patent: Jun. 13, 1989

[54] COMPUTER MEMORY BACK-UP
[75] Inventor: Robert J. Tindall, Romeo, Mich.
[73] Assignee: Kirsch Technologies, Inc., St. Clair, Mich.
[21] Appl. No.: 930,235
[22] Filed: Nov. 13, 1986

Related U.S. Application Data

[62] Division of Ser. No. 624,034, Jun. 25, 1984, Pat. No. 4,652,944.

[51] Int. Cl.[4] .................. H04N 5/782; H04N 5/94
[52] U.S. Cl. .................... 358/336; 360/38.1; 360/32; 371/10
[58] Field of Search .............. 358/335, 336; 360/15, 360/38.1, 32; 364/200, 900; 371/10, 38

[56] References Cited

U.S. PATENT DOCUMENTS

| | | | |
|---|---|---|---|
| 3,452,328 | 6/1969 | Hsiao et al. | 371/37 |
| 3,703,705 | 11/1972 | Patel | 371/37 |
| 3,731,282 | 5/1973 | Dancis et al. | |
| 3,859,630 | 1/1975 | Bennett | 371/37 |
| 4,000,510 | 12/1976 | Cheney et al. | |
| 4,028,733 | 6/1977 | Ulicki | |
| 4,041,463 | 8/1977 | Slutzky et al. | |
| 4,105,999 | 8/1978 | Nakamura | 371/37 |
| 4,161,728 | 7/1979 | Insam | |
| 4,202,018 | 5/1980 | Stockham, Jr. | 360/32 |
| 4,277,807 | 7/1981 | Baldwin | 360/32 |
| 4,315,323 | 2/1982 | Bronisz et al. | |
| 4,319,339 | 3/1982 | Utzerath | |
| 4,328,557 | 5/1982 | Gastinel | |
| 4,333,160 | 6/1982 | Kobari et al. | |
| 4,380,047 | 4/1983 | Eisenhard et al. | |
| 4,420,818 | 12/1983 | Lee et al. | |
| 4,422,105 | 12/1983 | Rodesch et al. | |
| 4,423,448 | 12/1983 | Frandsen | |
| 4,425,586 | 1/1984 | Miller | |
| 4,467,373 | 8/1984 | Taylor et al. | 360/32 |
| 4,519,003 | 5/1985 | Scholz | |
| 4,523,237 | 6/1985 | Fukuda et al. | 360/32 |
| 4,530,048 | 7/1985 | Proper | |
| 4,538,188 | 8/1985 | Barker et al. | |
| 4,544,958 | 10/1985 | Odaka | 360/32 |
| 4,652,942 | 3/1987 | Eto | 360/32 |

Primary Examiner—Donald McElheny, Jr.
Attorney, Agent, or Firm—Harness, Dickey & Pierce

[57] ABSTRACT

The interface apparatus couples a video recording device to the parallel data channel of a computer system and also to the computer video output circuitry, so that both digital information (such as computer programs or data files) and analog information (such as video signals for displaying on a TV monitor) may be stored on the same video recording medium. The apparatus thus permits storage of both digital information and human readable information in convenient back-to-back relationship. The interface also permits the computer video monitor to directly display stored or live video broadcasts, without computer intervention. The invention thus allows the display of graphic, photographic and motion picture information in analog format, thereby eliminating information loss through digitizing. An automatic search mode of the invention permits the computer to direct the video recording device to search for a predetermined location on the recording medium at high speed without human intervention.

1 Claim, 21 Drawing Sheets

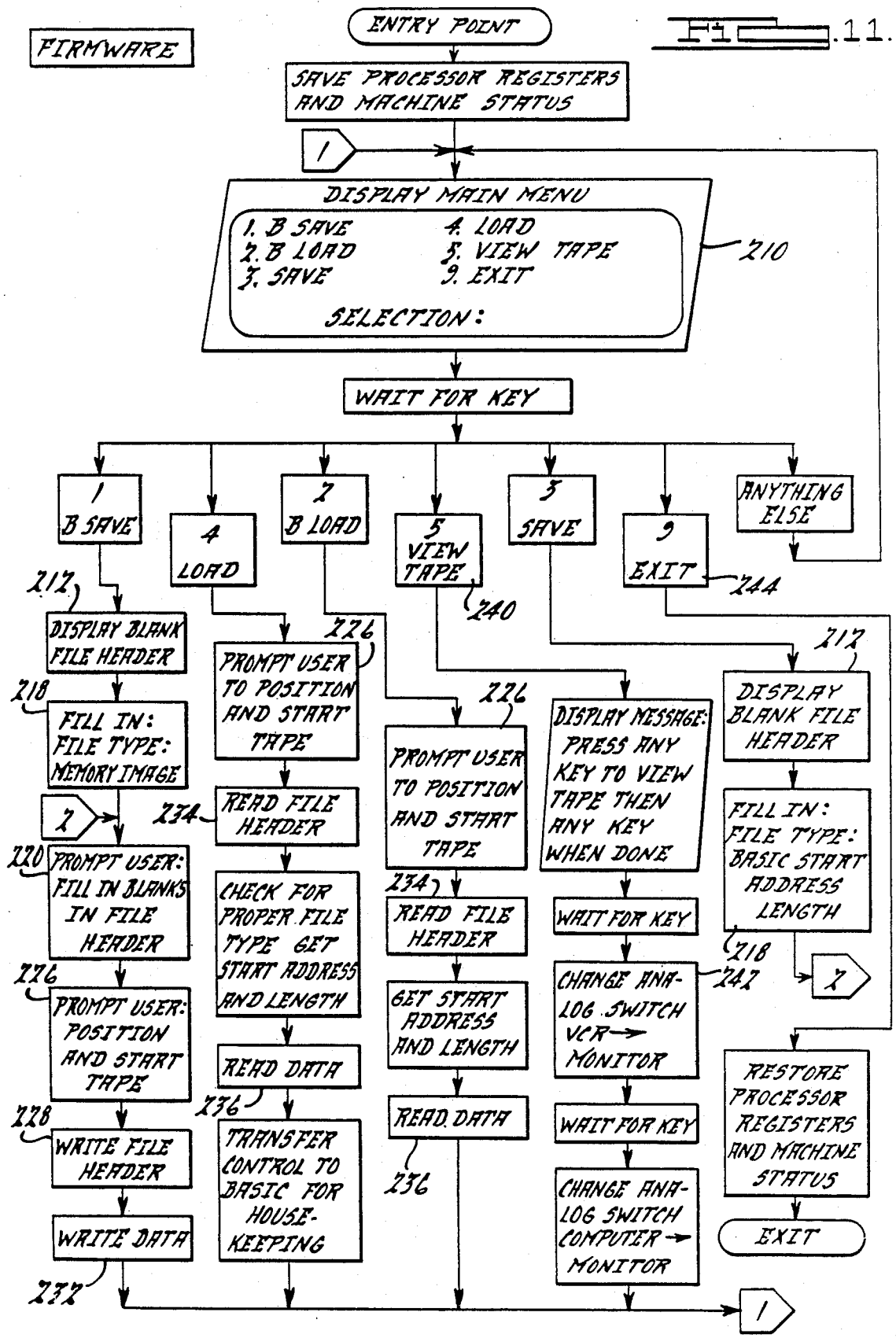

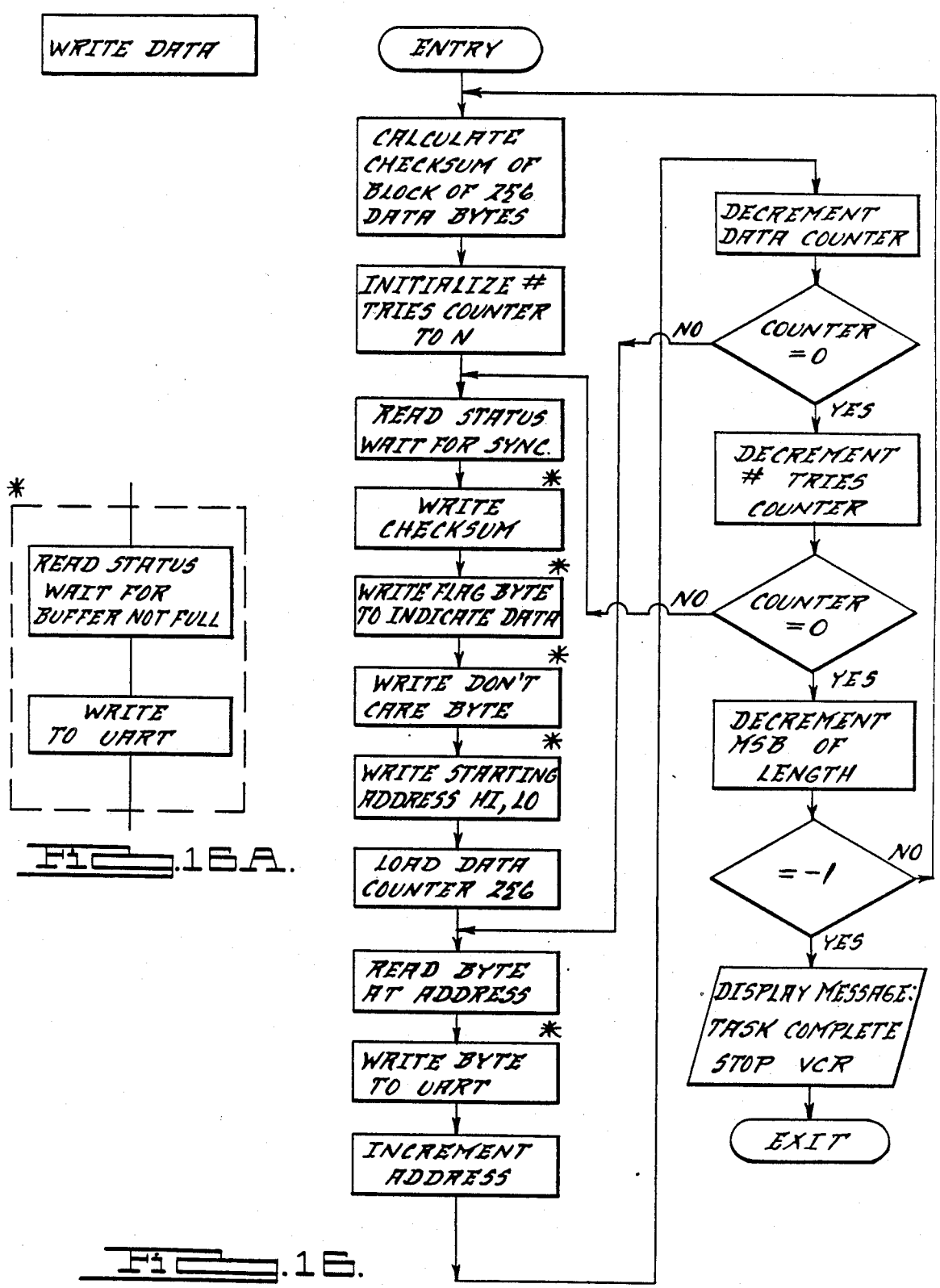

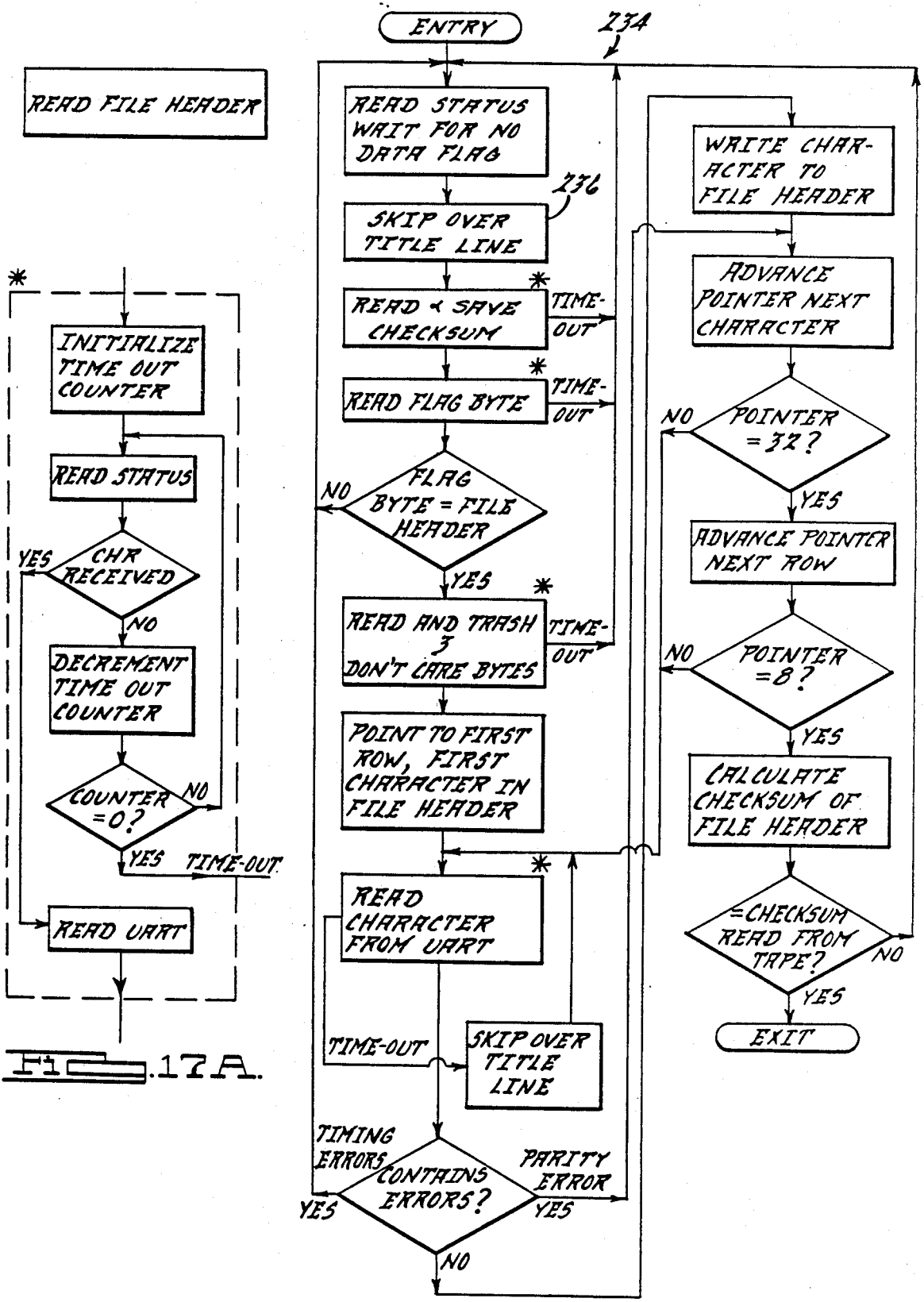

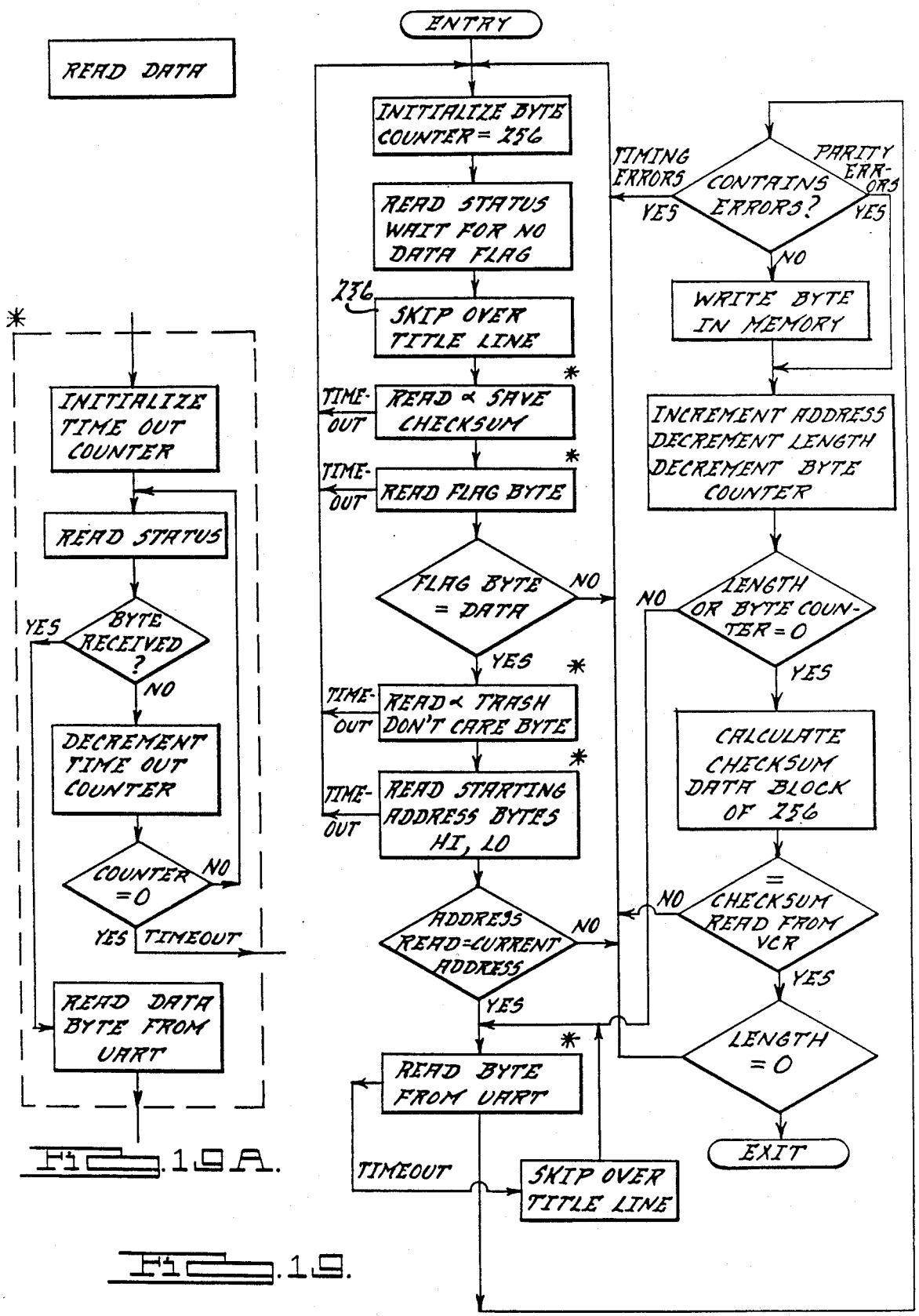

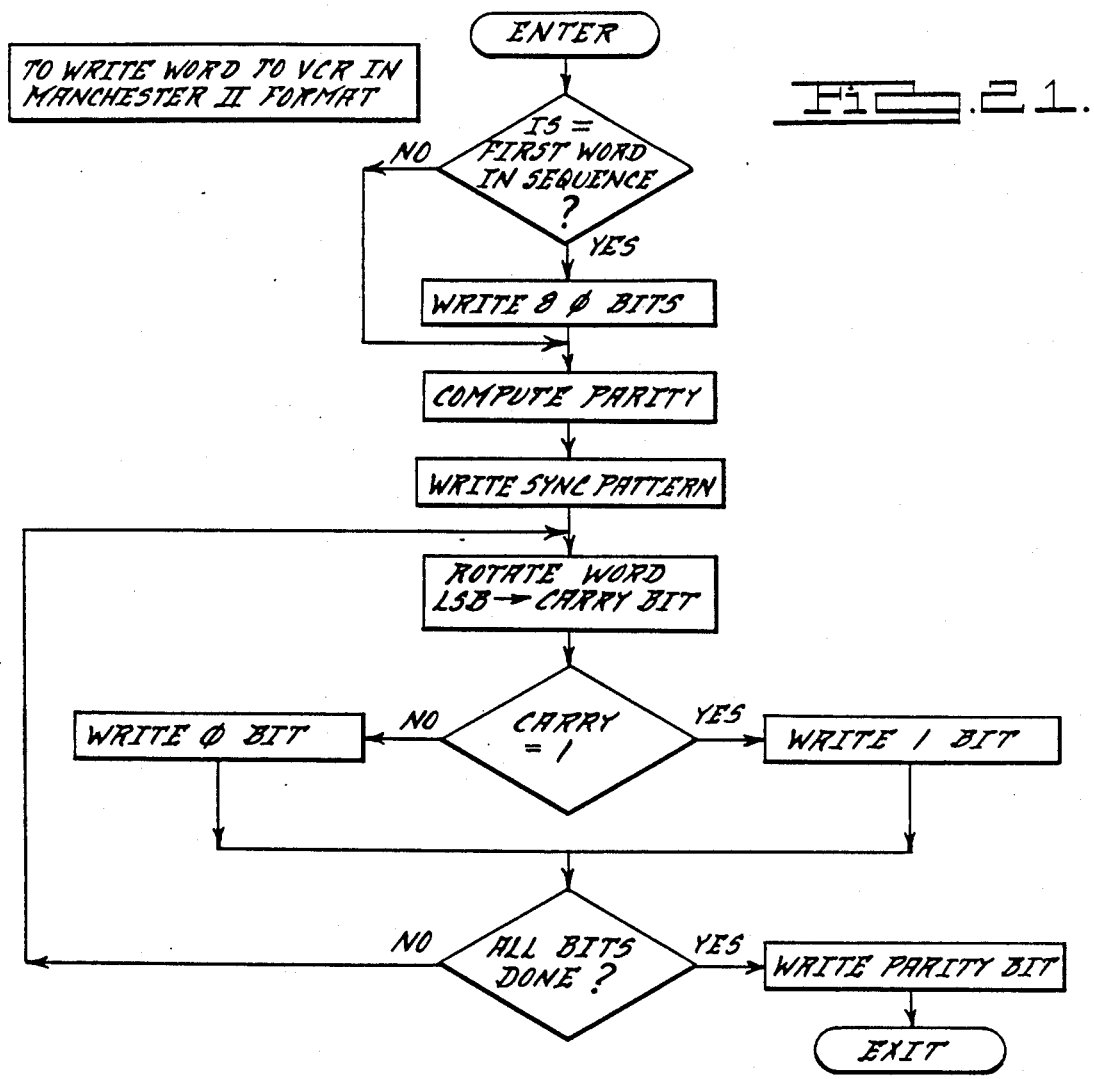
FIG. 21.
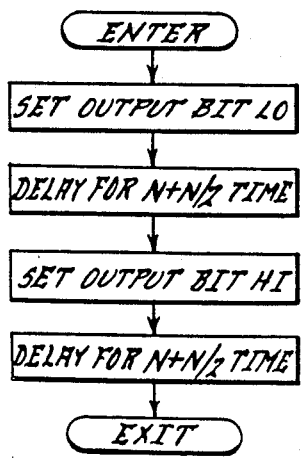
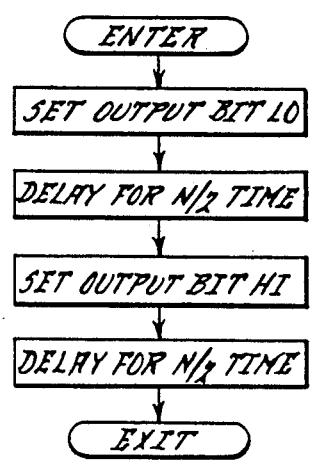
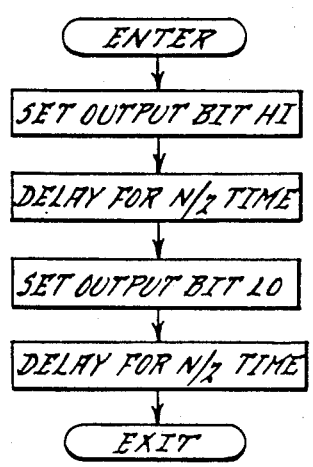

COMPUTER MEMORY BACK-UP

This is a division of U.S. Patent application Ser. No. 624,034, filed 6/25/84, now U.S. Pat. No. 4,652,944.

BACKGROUND AND SUMMARY OF THE INVENTION

This invention relates generally to computer data storage and video display equipment. More particularly, the invention relates to an apparatus for effecting the storage of computer generated digital information and analog video information using a video recording device such as a video tape recorder, VCR, or the like. Further, the invention relates to an apparatus for displaying video and television signals on a computer CRT monitor.

Present day computer systems employ architectures which provide for the storage of digital information by a number of different mechanisms, each having certain advantages and disadvantages. At the center of most computer systems is the central processing unit or CPU which interprets, processes and executes instructions (computer programs). The CPU coordinates the cooperation of various other elements of the computer system and also oversees the input/output procedures whereby the computer system communicates with peripheral devices. The instructions or computer programs which the central processing unit executes are stored in some form of memory device where they may be accessed by the CPU upon demand. These instructions are digital information usually comprising a plurality of binary digits or bits arranged into groups, commonly called bytes or words. In addition to executing instructions, the CPU also generates digital information also as groups of binary digits. The digital information so generated may represent additional computer instructions to be executed by the CPU or by some other processing unit, or the digital information may represent data to be stored, acted upon or displayed. Text files produced by work processing programs and source code computer program listings written in higher level computer languages are two examples of such data.

In order to store digital information, whether it represents computer instructions or data, so that the CPU can access it, and process and manipulate it quickly, random access memory (RAM) is included as a part of the computer system. Random access memory comprises an array of individually addressable electronic data cells, each capable of storing one binary digit or bit. Ordinarily these data cells are arranged in groups corresponding to the byte or word format of the digital information to be stored therein. One advantage of RAM memory is that digital information can be stored or retrieved very rapidly. One disadvantage of present day RAM is that it does not retain stored digital information when electrical power is interrupted. Because of this disadvantage with RAM memory, most computer systems also employ an alternate form of data storage, usually some form of magnetic data storage (floppy disks, fixed disks or hard disks, and the like). Such magnetic data storage media have the advantage of being able to store digital information magnetically, so that a constant supply of electrical power is not required.

One disadvantage of magnetic data storage systems is that the magnetic media are vulnerable to contamination by dirt, dust and other foreign materials. In the case of the hard disk or fixed disk system, this vulnerability to foreign contaminants is particularly acute since such systems employ rapidly rotating disks (3,000 rpm) and read/write heads positioned less than the thickness of a human hair above the surface of the disk. Even minute foreign particles, such as a single human hair, can cause the read/write head to bounce and crash into the disk surface, causing permanent damage almost instantaneously. Because of such vulnerability to contaminants it is considered wise practice to make duplicate or back-up copies of the stored data. In the case of floppy disk systems, a second diskette may be recorded to serve as a back-up copy. With hard disks, on the other hand, it has not proven practical to make back-up copies using additional hard disk storage devices, due to the relatively high cost of additional hard disk devices. Similarly, it has not proven practical to record back-up copies of a hard disk memory onto floppy diskettes, since a typical ten megabyte hard disk memory would require some thirty to forty or more individual floppy diskettes in order to provide a full back-up copy.

Due to the impracticality of using floppy diskettes to back-up hard disk memory systems, some hard disk systems include provisions for making back-up copies in serial format on cassette tapes, known as tape streamers. With such tape streamer systems the digital information is stored directly, in serial form, as a continuous sequence or stream of bits. Such tape streamer systems are comparatively quite expensive. In addition to tape streamers, there have been proposed other systems for producing back-up copies using audio and video cassette tape recording systems.

A common problem with all tape back-up systems, digital tape streamers, audio cassettes and video cassettes alike, is that the digital information serially stored on such devices may not be randomly accessed and viewed by the human operator. The human operator cannot browse through the contents of the back-up copy as one might browse through chapter headings of a book, since these back-up systems do not provide any human readable information. While most computer systems employ a video monitor for displaying human readable information, these back-up systems of the prior art cannot convey video information to such video monitors directly while the back-up tape is being replayed.

The present invention overcomes these shortcomings by providing a computer memory back-up system which permits the storage of both digital information (computer instructions and digital data) as well as analog video information using a single video recording apparatus, such as a video tape recorder, VCR, or the like. Using the invention, the computer operator can back-up the entire computer memory, or only selected files or blocks of computer memory, while at the same time recording analog video information that may be played back directly by the computer's video monitor or an auxiliary monitor or television set without further processing by the computer's central processing unit. The video analog information may, for example, comprise an informative header conveying human readable information about the digital data stored elsewhere in the video recording device.

The invention greatly simplifies producing back-up copies of computer data files or programs by permitting the operator to record a human readable file header describing the data file or program to follow. The computer operator is thus able to browse through the contents of the information stored in the video recording device, to locate a particular file or program or to make changes to that file or program without affecting other data stored elsewhere in the video recording device.

The invention supports the broad capability of recording and displaying any type of analog video information, not just human readable text. For example, graphic information including both still and motion pictures may be integrated with digital information upon the same recording medium. Because the analog video information can be directly displayed using the computer's video monitor or an auxiliary monitor or television set without manipulation by the central processing unit, the video information enjoys an inherently much higher resolution than computer generated graphics. Photographs, motion pictures, blueprints and other visual information can be read and stored in analog form using video television cameras or the like without the need to digitize the information to make it computer compatible. Furthermore, the invention also supports the capability to display video or television signals directly upon the computer CRT monitor. This feature may be used, for example, to display prerecorded taped or broadcast television, or live television on the CRT monitor—for training sessions, interoffice communication or the like.

In accordance with the invention, an apparatus for storing and retrieving digital and analog information using a video recording device having a means for serially storing video information is provided. The invention is intended for use with a computer system having a central processing unit for processing digital information through a parallel data channel and further having a video output means responsive to the central processing unit for generating analog information and for generating video sync signals. The invention comprises a parallel to serial conversion means coupled to the parallel data channel to receive the digital information and to provide the digital information in serial form. A signal processing means is receptive of the analog information and video sync signals and is further coupled to the conversion means to receive the digital information. The signal processing means selectively provides to the video recording device either a first video signal or a second video signal. The first video signal comprises the composite of the analog information and the video sync signals while the second video signal comprises the composite of the digital information and the video sync signals. In this fashion, both analog information and digital information may be stored upon the serial storage medium of the video recording device.

When used in conjunction with a video monitor, such as a video monitor responsive to the analog information and video sync signals generated by the computer system, e.g., the computer video monitor, the invention has the capability of directing analog video information directly to the video monitor without further processing by the central processing unit. In accordance with the invention a signal directing means controlled by the central processing unit and receptive of the serially stored video information from the video recording device is provided. The signal directing means is further receptive of analog information and video sync signals from the video output means of the computer system. The signal directing means is coupled to the video monitor for selectively directing to the video monitor either the serially stored video information from the recording device or the analog information and video sync signals from the computer system, thereby permitting the visual display of both sources of information upon the same video monitor.

In the preferred embodiment the invention is adapted to plug into one of the computer systems peripheral expansion slots, so that it may be housed entirely within the computer cabinet. The invention thus takes up no valuable desk top space and is capable of deriving electrical power directly from the computer system power supply through the expansion slot. The invention further comprises firmware storage of all computer instructions needed to assist the central processing unit in interfacing with the invention automatically. Such instructions make it possible for the invention to determine what type of computer system it is connected to and also the computer memory address or addresses where programs or data to be saved presently reside.

The invention further includes means for extracting video sync signals directly from the video output circuit within the computer system to insure compatability and also to make most efficient use of existing hardware without duplication. A mixing circuit is receptive of the serialized digital information from the signal processing means and also receptive of the extracted video sync signals. The mixing circuit provides a data video signal comprising digital information and video sync signals in a predetermined relationship, providing data video signals which are compatable with the storage format of the video recording device.

The invention further provides automatic search capabilities, whereby digital information can be stored and retrieved at a predetermined location on the video recording medium. A means is provided for converting the digital information into video information so that the information may be stored on the video recording medium. A means is also provided converting the serially stored video information into digital information, so that it may be processed by the computer system. In addition, a means for encoding a plurality of serially spaced markers on the recording medium is provided. Each marker corresponds to a different storage location on the medium. A control means responsive to the central processing unit and also responsive to the markers controls the video recording device causing it to position the recording medium at a location prescribed by the computer system. When a video tape recorder is used as the video recording device, the markers may be encoded on the audio recording track of the video tape, using a self-clocking code such as the Manchester code or the equivalent. If necessary, a video tape recorder may require modification to permit the audio read/write head to remain in contact with or in close proximity to the recording medium when the video recorder is operating in fast forward or fast reverse modes. The automatic search function permits the computer, acting through the interface apparatus of the invention, to search for a particular location on the tape or recording medium at fast forward or fast reverse speeds, and then to automatically commence recording or playback at normal recording and playback speeds. The automatic search feature thereby allows the computer to locate a desired data file quickly and automatically.

These and other objects and advantages of the invention will become more apparent from a review of the following specification and with reference to the accompanying drawings.

BRIEF DESCRIPTION OF THE DRAWINGS

FIG. 10 diagrammatically depicts a television screen or raster, showing the portion thereof which is utilized by the invention;

FIGS. 11–19 are flow chart diagrams illustrating the operation of the invention;

FIGS. 21–26 are flow chart diagrams illustrating the operation of the autoseek portion of the invention.

DESCRIPTION OF THE PREFERRED EMBODIMENT

Figure 1:
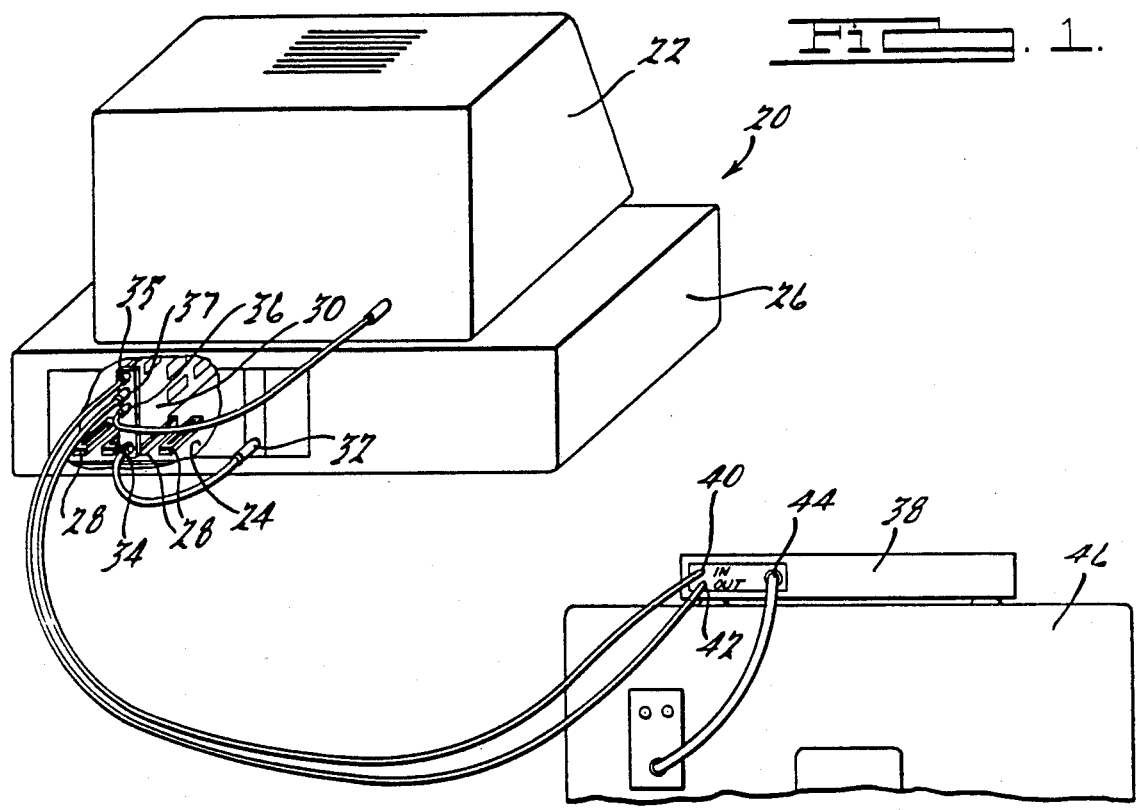
FIG. 1 is a perspective view illustrating a typical computer system and video recording device with which the invention may be used.

Referring first to FIG. 1, a computer system with which the invention may be operated is illustrated generally at 20. The computer system includes video monitor 22 and computer system board or mother board 24 housed within cabinet 26. Mother board 24 includes a plurality of expansion slots 28 into which peripheral devices may be inserted. In its presently preferred embodiment the invention is assembled on circuit board 30 which is adapted for plugging into one of the expansion slots 28. The computer system 20 may also include a keyboard terminal or some other data entry device permitting a human operator to run programs and execute commands.

In the usual fashion, computer system 20 also includes a video output circuit for providing analog video signals and sync signals to video monitor 22. The video output circuit may, for example, reside on mother board 24 and provide one or more video output ports, such as video output port 32 to which video monitor 22 would normally be attached. The present invention in the preferred embodiment is adapted for coupling to video output port 32 to extract video sync signals as needed and also to route the analog video signals to various destinations as will be described more fully herein. Accordingly, circuit board 30 of the invention includes a video input port 34 for coupling to video output port 32 and also includes a video output port 36 for connection to the video monitor 22. It will thus be seen that the invention is interposed between the computer's video output port 32 and the video monitor 22.

While the invention is being described in a microcomputer environment, such as computer system 20, it will be understood that the principles of the invention may be readily adapted for use in other computer system architectures.

The invention may further be used with a video recording apparatus 38 such as a video tape recorder, VCR or other comparable device. The invention may likewise be used with other sources of video, e.g., television tuners, video cameras, as well. For illustration purposes, a video recording apparatus will be shown. Such video recording apparatus includes video input port 40, video output port 42 and RF output port 44. The RF output port 44 may be connected to a video monitor or television set 46 in the usual fashion. In addition, the VCR video input port 35 of the invention is connected to the video output port 42 of the video recording apparatus, while the VCR video output port 37 of the invention is coupled to the video input port 40 of the recording apparatus. It will be understood that while a video tape recorder is presently preferred for storing information using the invention, other equivalent video recording devices may be substituted therefor without departing from the scope of the invention. In the presently preferred embodiment the invention produces and receives video signals through the VCR video input and output ports 35 and 37. These signals are in conformance with the Electronic Industries Association (EIA) RS-170 Electrical Performance Standards For Television Signals. While the embodiment described herein implements monochrome television signals, the principles of the invention may be extended to color video as well.

Figure 2:
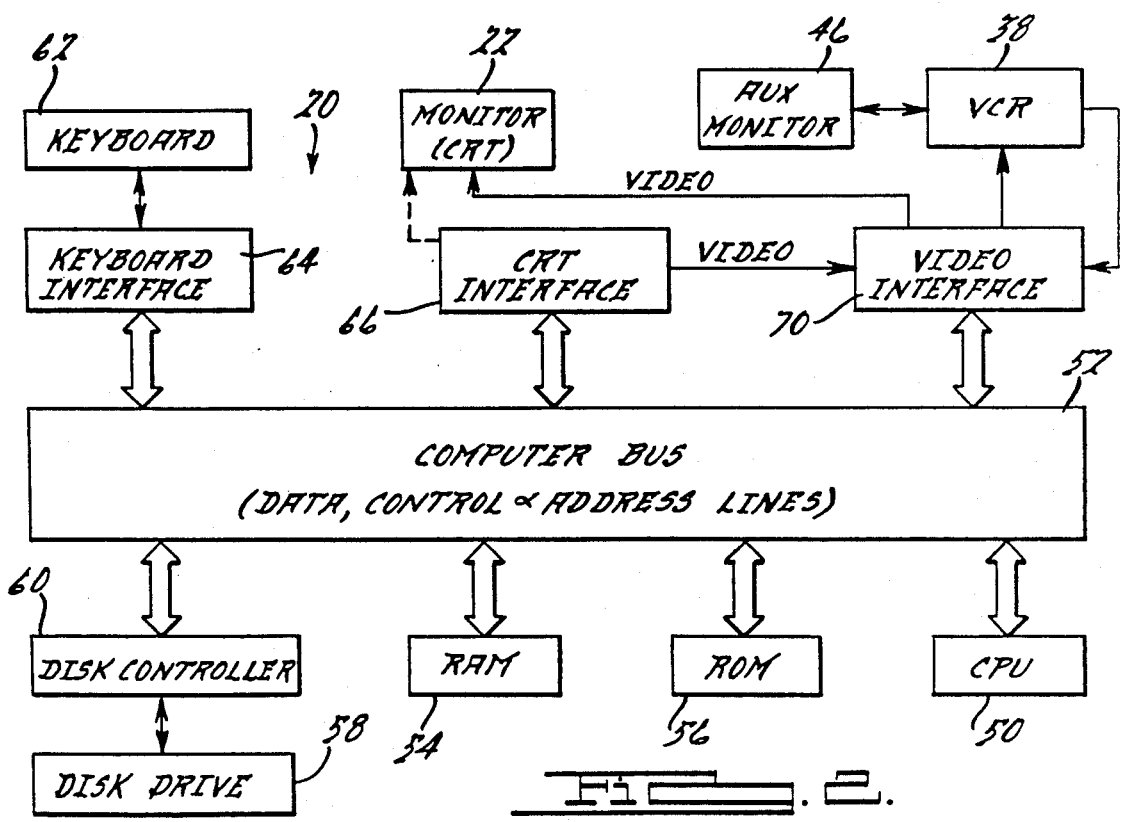
FIG. 2 is a block diagram of the computer system of FIG. 1.

Referring to FIG. 2, a typical computer system is illustrated in block diagram in conjunction with a video recording device, auxiliary monitor, and the interface circuit of the invention. FIG. 2 illustrates central processing unit (CPU) 50 communicating with computer bus 52 which includes a parallel data bus, an address bus and a plurality of control lines. The computer system further includes random access memory (RAM) 54, read only memory (ROM) 56, and may also include a disk drive 58 which communicates with computer bus 52 through disk controller 60. Disk drive 58 may be either a floppy disk drive or a hard disk or fixed disk drive. The computer system 20 may further include a keyboard 62 communicating through keyboard interface 64 to the computer bus 52. In addition, a video output device 66 is coupled to computer bus 52 and is responsive to CPU 50 to provide analog information and video sync signals. The video output device 66 may, for example, be disposed on the computer mother board of FIG. 1, or it may be disposed within a computer terminal also including keyboard and video monitor, or it may be disposed at some other location within the computer system. The video output device 66 may, for example, include hardware character generators for producing alphanumeric characters displayable on a video monitor, or the video output device may be under software control and capable of forming alphanumeric characters by selectively illuminating various pixels on a cathode ray tube (CRT). In general, video output device 66 interprets instructions from the CPU 50 and produces a video signal capable of producing alphanumeric characters or graphics upon a computer video monitor such as monitor 22. Normally the video output device 66 would be coupled to monitor 22, as illustrated by the dashed line, for this purpose.

When the invention is used within computer system 20, video output device 66 is no longer coupled directly to monitor 22. Instead, video output device 66 is coupled to the interface apparatus of the invention designated generally at 70. Apparatus 70 in turn is coupled to video monitor 22. The interface apparatus of the invention is further coupled to computer bus 52 so that it may receive instructions and digital data via the parallel data bus, address bus and control lines of the computer system. The interface apparatus 70 provides signals to and receives signals from the video recording device 38. Communication between the interface apparatus 70 and video recording apparatus 38 is done serially. If desired, an auxiliary monitor or television set 46 may be connected to the video recording apparatus.

Figure 3:
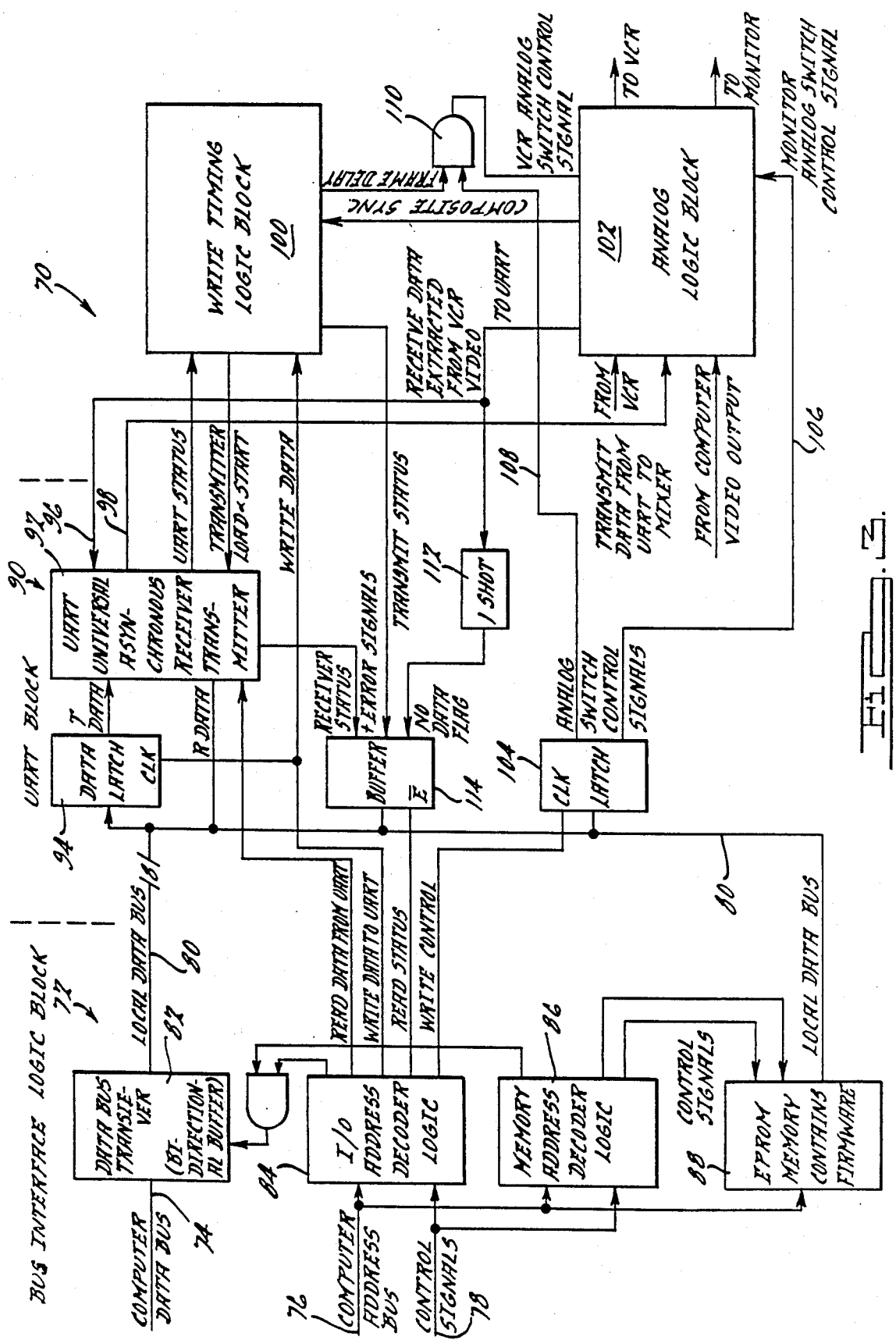
FIG. 3 is a block circuit diagram of the invention.
Figure 4:
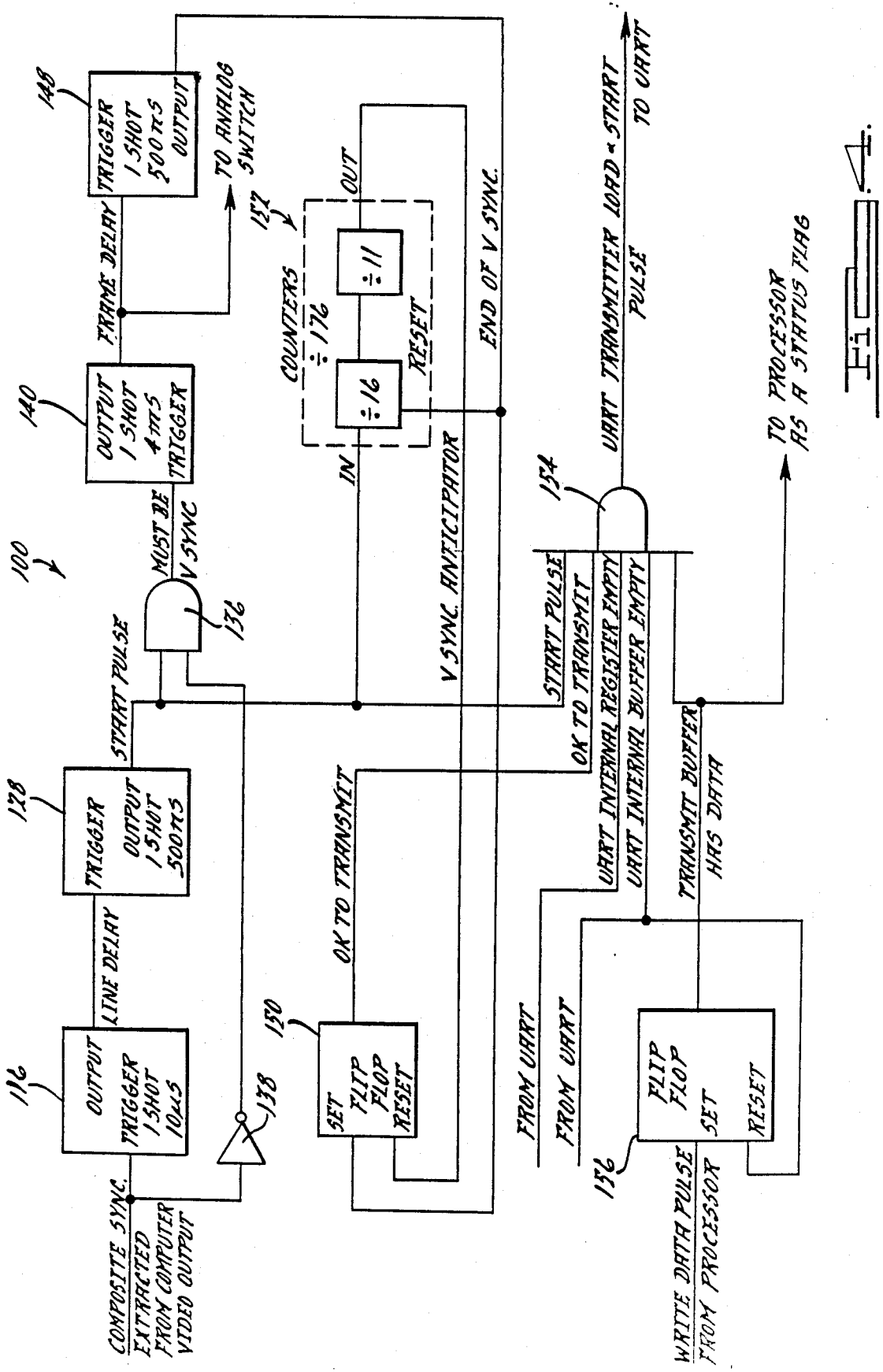
FIG. 4 is a block diagram illustrating the timing logic block of the invention.
Figure 5:
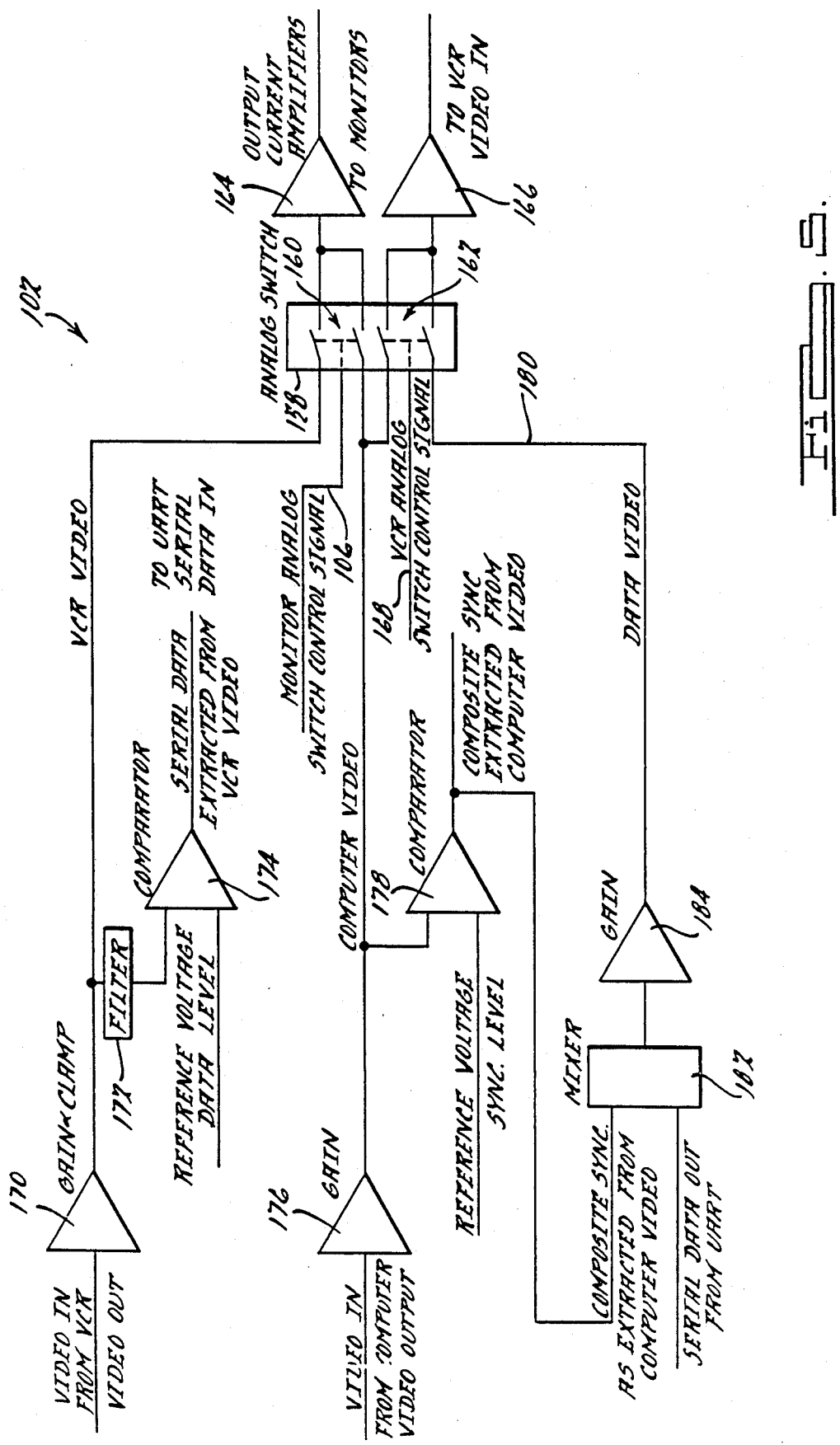
FIG. 5 is a block diagram illustrating the analog logic block of the invention.

Turning now to FIGS. 3, 4 and 5, the interface apparatus 70 of the invention will be discussed in greater detail. FIG. 3 is an overall block diagram of the interface apparatus, while FIGS. 4 and 5 depict the write timing logic blocks and analog logic blocks, respectively. With specific reference to FIG. 3, apparatus 70 includes a bus interface logic block denoted generally by reference numeral 72. The bus interface logic block couples the apparatus of the invention to the computer data bus 74, computer address bus 76, and to the control signal lines 78. More specifically, computer data bus 74 is coupled to local data bus 80 of the invention through data bus transceiver circuit 82. Data bus transceiver 82 serves as a bidirectional buffer and may be implemented using a 74LS245 integrated circuit or the equivalent. It will be recognized that while the 74LS245 integrated circuit provides an eight bit bidirectional buffer, for use with eight bit computer systems, the principles of the invention may be extended to other computer architectures as well, such as sixteen bit, twenty four bit, thirty two bit, and so forth.

The computer address bus 76 and control signal lines 78 are coupled to an input/output address decoder logic circuit 84 which may be implemented using 74LS155 decoder integrated circuits, or the like, to provide a read data signal, a write data signal, a read status signal, and a write control signal. The invention further includes a firmware storage apparatus such as an EPROM 88, or the like for storing the computer instructions used to implement the invention. These instructions will be discussed more fully below in connection with the accompanying flow chart drawings. If required, memory address decoder logic circuit 86 may be coupled to computer address bus 76 and control signal lines 78 in order to fully couple EPROM 88 to computer address bus 76. EPROM 88 is coupled to local data bus 80 in order to make the program instructions available to the computer system CPU 50. EPROM 88 may be implemented using a 2732 integrated circuit, or the like. It will, of course, be understood that the bus interface logic block 72 must be designed to interface with a particular make and model of computer, thus the specific details of the interface logic block are subject to modification without departing from the scope of the invention as set forth in the appended claims.

The interface apparatus of the invention further includes a transmitting and receiving circuit or UART block 90. UART block 90 included a universal asynchronous receiver transmitter or UART 92, which may be implemented using an IM6402A integrated circuit. Coupled to the transmit data line of UART 92 is a data latch which serves as an external buffer 94 to UART 92. External buffer 94 is coupled to receive signals from local data bus 80. UART 92 is coupled via its receive data line local data bus 80. UART 92 also provides a pair of serial input and output leads 96 and 98, respectively, for receiving and transmitting digital information in serial format. In general, UART 92 serves as the link between local data bus 80, a parallel data channel, and leads 96 and 98 which form a serial data channel. UART 92 is controlled by write timing logic block 100, yet to be discussed, and also by CPU 50 via the read data and write data lines of input/output address decoder logic circuit 84. UART 92 communicates through input and output lines 96 and 98 with analog logic block 102, which will be discussed more fully below in connection with FIG. 5.

Analog logic block 102 is controlled by switching signals provided by latch circuit 104 coupled to local data bus 80. Latch 104 provides a Monitor Analog Switch Control Signal on lead 106, and a VCR Analog Switch Control Signal on lead 108. The VCR Analog Switch Control Signal on lead 108 is used in conjunction with a frame delay signal from write timing logic block 100. These signals are input to AND gate 110 to provide the VCR Analog Switch Control Signal. The frame delay signal gates the VCR Analog Switch Control Signal so that the VCR or other recording device is coupled to receive data after a predetermined frame delay time. As will be explained more fully below, the frame delay time is used to insure that data is stored well within the visible center region of the video raster so as not to conflict with sync pulses.

The invention further includes a circuit for detecting when data is absent on serial input line 96 so that video frames may be distinguished from one another. As will be more fully explained below the invention writes data to the video recording device in blocks of 256 bytes at a density of one byte per video line. Only a portion of the video frame is used to store data and the invention utilizes two consecutive frames to store a given 256 byte block. The second frame has fewer lines of data than the first frame and includes a tail end portion consisting of a plurality of blank lines (lines with no stored data). One shot multivibrator 112 is coupled to line 96 so that any incoming data on line 96 will continually reset the one shot multivibrator 112. When the blank line tail end portion of a second frame is encountered, one shot multivibrator 112 times out and sets a no data flag which is latched in buffer 114. Buffer 114 also receives a receiver status signal and error signals from UART 92 and a transmit status signal from write timing logic block 100. As will be explained below, buffer 114 provides an indication to the CPU that the transmit buffer has data.

Figure 7:
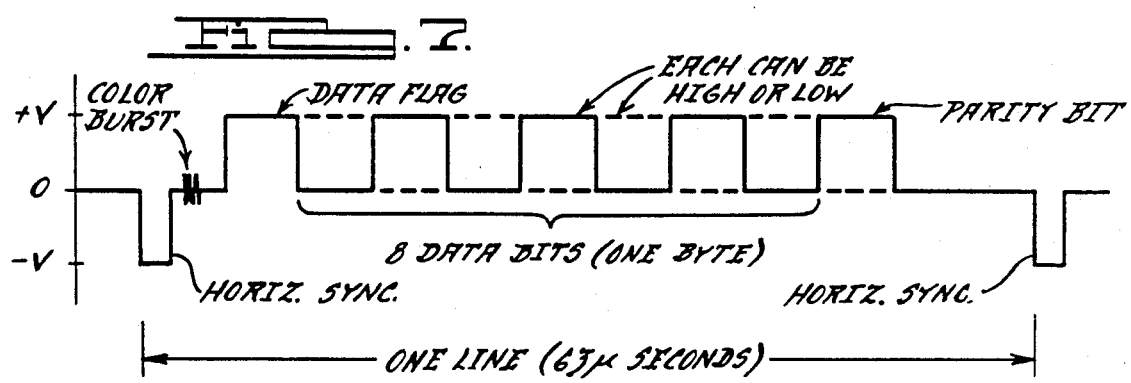
FIG. 7 is a wave form diagram illustrating the manner in which digital data is encoded on a video wave form.
Figure 8:
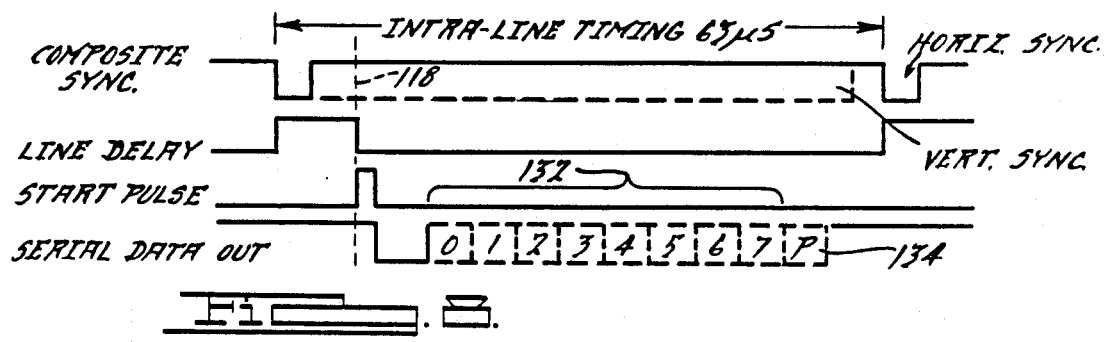
FIG. 8 is a timing diagram illustrating the operation of the invention over one video line.

Referring now to FIG. 4 the write timing logic block 100 will now be described in detail. In order to fully understand the write timing logic block 100 reference may also be had to FIGS. 6 and 7, which depict typical video waveforms processed or generated by the invention, together with FIGS. 8, 9 and 10 which depict the system timing in relation to video sync timing and the video raster pattern. Write timing logic block 100 includes a line delay timer 116 which provides a ten microsecond output pulse upon detection of the composite sync pulse generated by the computer video output device 66. If not already provided by the video output device, the composite sync pulse may be extracted from the composite video signal as will be discussed in connection with the analog logic block shown in FIG. 5. With reference to FIG. 8, line A thereof depicts the composite sync pulse. in accordance with EIA RS-170 standards, the intraline timing between sync pulse is 63 microseconds. As indicated, the composite sync pulse includes both vertical sync and horizontal sync components. The output of delay timer 116 is shown on line B of FIG. 8. The falling edge of the line delay pulse indicated by the dashed line 118 begins the left boundary of usable video. FIG. 10 illustrates the usable video area of television display. The larger rectangle 120 represents the entire raster or frame, while the inner rectangle 122 represents the usable display area. The portion of rectangle 120 to the left of rectangle 122 represents the horizontal blanking area of the display, while the portions of rectangle 120 above and below 122 represent the vertical blanking areas. The invention is adapted to write a byte of digital data in the usable video area depicted by inner rectangle 122. More specifically, the dashed rectangle 124 depicts the area actually used by the invention to store data in the first frame of a two frame block. The dotted rectangle 126 depicts the actual area used by the invention to store data in the second frame of a two frame block. Falling edge 118 determines the left-hand edge of rectangular area 124 and 126.

The output of line delay timer 116 is coupled to one shot multivibrator 128 which produces a 500 nanosecond trigger pulse or start pulse. The start pulse is depicted on line C of FIG. 8. The falling edge of the start pulse signals the beginning of a serial data stream. The data stream is illustrated on line D of FIG. 8. It begins with a start bit 130, followed by eight data bits 132 and one parity bit of 134. Data bits 132 and parity bit 134 are shown as dotted lines since they may assume various logical high and low combinations.

Figure 9:
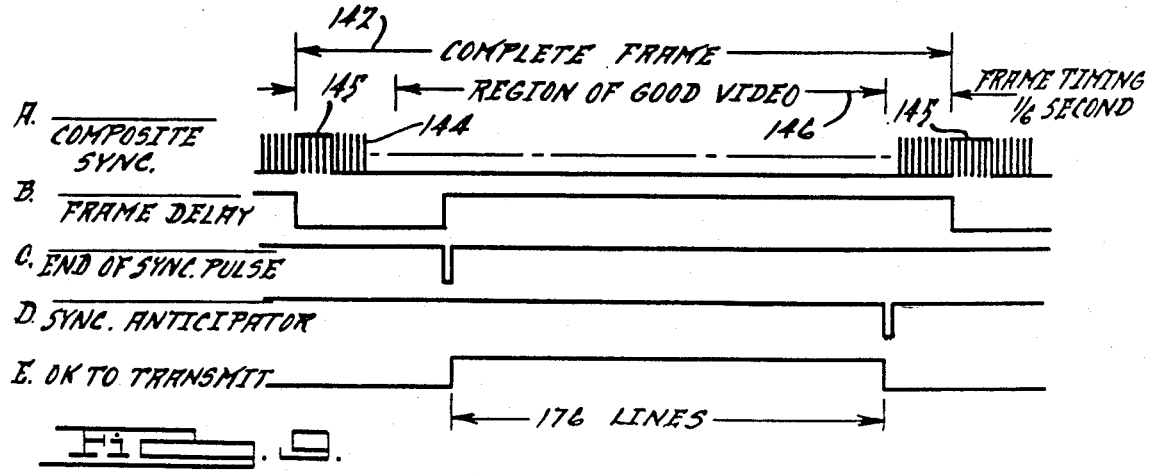
FIG. 9, A–E, is a timing diagram illustrating the operation of the invention over one video frame.

AND gate 136 is receptive of the start pulse and also coupled through inverter 138 to receive the composite sync signal. AND gate 136 extracts the vertical sync signal from the composite sync signal which in turn activates one shot multivibrator 140. Multivibrator 140 provides a four millisecond frame delay pulse illustrated on line B of FIG. 9. Line A of FIG. 9 depicts one complete video frame 142 consisting of a plurality of individual video lines 144 spaced between composite sync pulses 145. The upper and lower limits of usable video area, corresponding to the upper and lower edges of inner rectangle 122, is illustrated at 146. As noted earlier, the invention writes data to the smaller rectangular areas 124 and 126 within the usable video area 122.

The frame delay pulse triggers one shot multivibrator 148 which produces a 500 nanosecond pulse to commence writing data to the first line within rectangular areas 124 and 126. Line C of FIG. 9 depicts the 500 nanosecond pulse which sets flip flop 150 to a first bistable state, indicating that data may now be transmitted. The 500 nanosecond pulse from one shot multivibrator 148 also resets counter circuit 152. Counter circuit counts 176 video lines and produces a reset pulse when 176 lines have occurred. The reset pulse of counter circuit 152 resets flip flop 150 to a second bistable state indicating that data may not be transmitted. Counter circuit 152 anticipates the occurrence of the next vertical sync pulse and insures that data is not transmitted during the vertical sync pulse interval. The reset pulse produced by counter circuit 152 or the sync anticipator pulse is illustrated on line D of FIG. 9. Line E of FIG. 9 depicts the time during which data may be transmitted. It will be understood while counter circuit 152 times out after 176 lines, in anticipation of the next vertical sync pulse, the invention may be implemented using larger or smaller counting sequences. The 176 lines count is presently preferred although not critical.

In general, counter 152 should insure that data will be transmitted when the vertical sync pulse occurs. In addition, by breaking a 256 byte block of data into unequal portions, i.e., a first frame of 176 bytes and a second frame of 80 bytes, the data is stored in a staggered relationship which makes it easier to distinguish between first and second video frames.

Write timing logic block 100 also includes logic gate 154 for providing a UART Transmitter Load and Start pulse. Logic gate 154 receives the start pulse from one shot multivibrator 128 and also receives the transmit signal from flip flop 150. Logic gate 154 is also coupled to UART 92 to receive a signal indicating that the internal register of the UART is empty and also to receive a signal indicating that the internal buffer of the UART is empty. In addition to logic gate 154, a flip flop 156 is also provided to monitor the status of external buffer 94. When external buffer 94 is full of data, flip flop 156 outputs a Transmit Buffer Full pulse to logic gate 154. When all five inputs of logic gate 154 are simultaneously satisfied, an output pulse is produced causing the UART to commence transmitting data. It will be seen that through the use of internal buffer 94 in combination with gate 154 and flip flop 156, the internal buffer within UART 92 is defeated, thereby permitting data to be transmitted through UART 92 under control of CPU 50. CPU 50, it will be recalled, provides the write data signal via input/output address decoder logic circuit 84. This write data signal controls the set terminal of flip flop 156.

Referring now to FIG. 5, the analog logic block 102 is illustrated in greater detail. Analog logic block 102 includes an analog switching block 158 comprising two double pole single throw, electrically controlled switches 160 and 162. Analog switching block 158 may be implemented using a CD4066BCN integrated circuit or the like. Such integrated circuit provides a quad bilateral switch for the transmission or multiplexing of analog or digital signals. The output leads of switch 160 are tied together and coupled to output current amplifier 164 for interfacing with and supplying video signals to a video monitor such as monitor 22. The output leads of switch 162 are tied together and coupled to output current amplifier 166 for interfacing with and providing video signals to the video input port 40 of the video recording device. Switch 160 is operated under software control by the Monitor Analog Switch Control Signal on lead 106. It will be recalled that the Monitor Analog Switch Control Signal is provided by latch circuit 104. Similarly, switch 162 is actuated under software control by the VCR Analog Switch Control Signal on lead 168. The VCR Analog Switch Control Signal is provided by the AND gate 110, which is in turn responsive to latch circuit 104.

Switch 160 selectively couples either a first video signal or a second video signal to the output current amplifier 164 and ultimately to a video monitor such as monitor 22. The first video signal is designated VCR video and is derived from video signals from the video recording apparatus. The second video signal, designated computer video, is derived from computer video output device 66. More specifically, VCR video is derived from output port 42 of the video recording device using gain and clamp circuit 170. Gain and clamp circuit 170 voltage clamps the video signal to a fixed level at approximately 4 volts to eliminate the need for precision components. The VCR video signal is also processed through filter 172 and compared against a reference voltage data level in comparator 174 to extract serial data from the VCR video signal. This serial data is provided to the serial data input port of UART 92. The computer video signal is derived from the computer video output signal through gain circuit 176. The computer video signal is similarly compared against a reference voltage sync level in comparator 178, to extract a composite sync signal from the computer video signal.

Switch 162 in a similar fashion selectively couples either a first video signal or a second video signal to current amplifier 166 and ultimately to the video input port 40 of the video recording device. The first video signal comprises the computer video signal described above. The computer video signal comprises analog information and sync signals which convey human readable alphanumeric characters, graphics, still or motion pictures of the like. The second video signal comprises a data video signal on lead 180. The data video signal is derived from the composite sync signal extracted by comparator 178. Mixer 182 receives the composite sync signal and the serial data from the serial output port 98 of the UART and combines them into a data video signal. The data video signal is amplified by gain circuit 184 and comprises computer generated digital information in a serial format with imbedded sync pulses, meeting the EIA standards for television or video recording.

Having thus described the interface circuit of the invention, a description of the operation now follows. In conjunction with this description reference may be had to the flow chart diagrams comprising FIGS. 11 through 19. FIG. 11 depicts the main menu 210 of commands available in the presently preferred firmware implementation of the invention. As illustrated, the main menu provides two binary read and write commands, B Load and B Save, for reading data from the video recording device and for writing data to the video recording device. The B Load and B Save commands may be used, for example, to store and retrieve assembly language object code programs or raw digital data. Main menu 210 also provides Save and Load commands for writing and reading files such as those produced by higher level languages like BASIC. The main menu also includes a View Tape command which, when selected, causes the information stored on the video recording device to be directed to the computer video monitor. This allows the user to read file header information directly, without interpretation by the computer, in order to determine what has been stored on the video recording device or to select a particular file for loading or editing. Finally, the main menu includes an exit command which restores the state of the CPU machine and returns control of the computer to the computer operating system.

Figure 12:
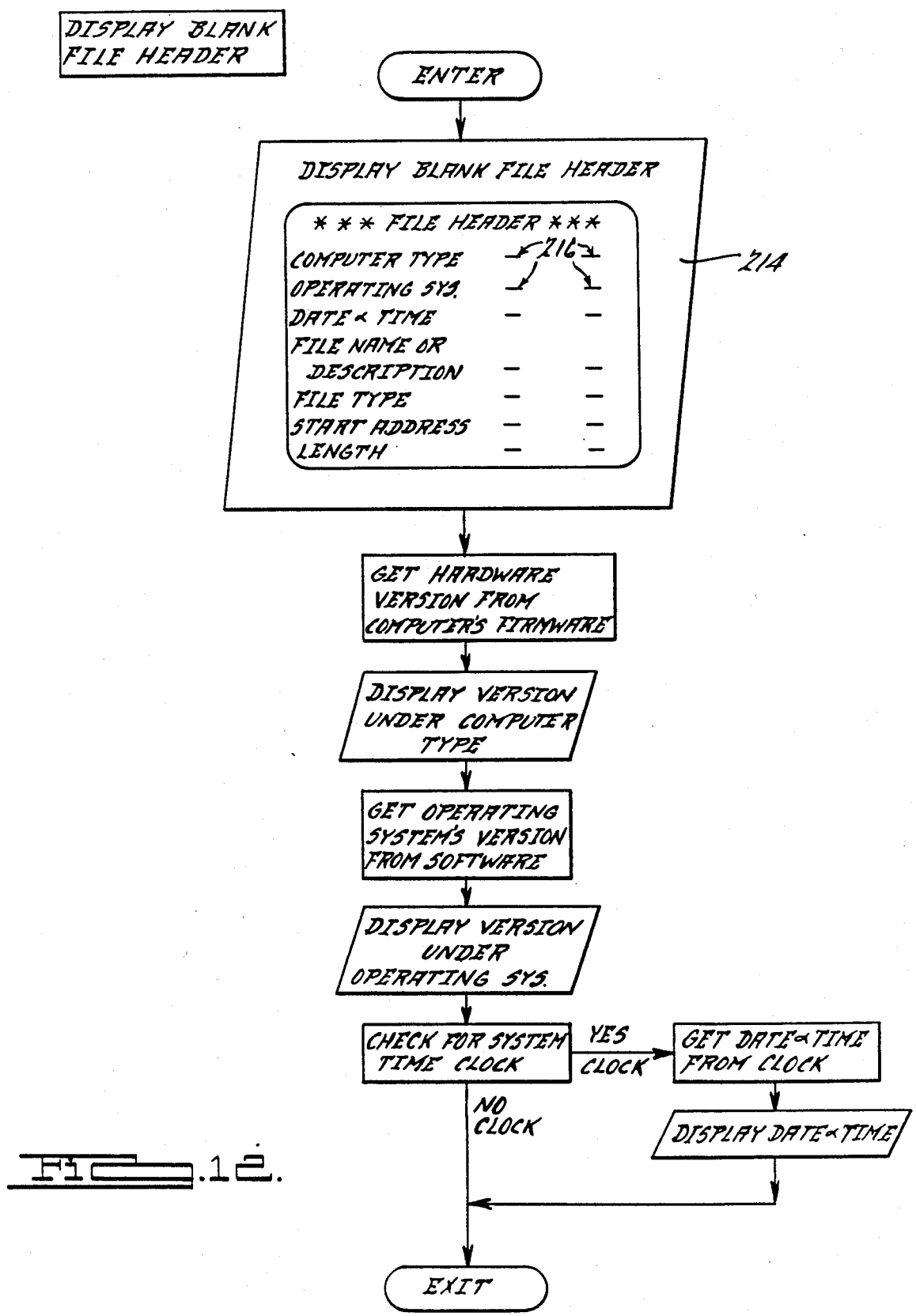

Reviewing FIG. 11 it will be noticed that the flow charted sequence for the B Save and Save commands both include an instruction to display a blank file header. This instruction is designated by reference numeral 212. The display blank header routine is illustrated more completely in FIG. 12. Referring to FIG. 12, when either B Save or Save commands are entered, a blank file header resembling file header 214 is written to the video monitor. Most computer systems reserve one or more memory locations in which to store identifying information about the hardware and operating system software implemented on that particular computer. The present invention is provided with firmware instructions which cause the CPU to interrogate those reserved memory locations and return information identifying the particular hardware and software. This information is written automatically to the file header (or the user may type the information into the space provided in the field between delimiters 216). If the computer system is equipped with a system time clock, the date and time is read from the clock and displayed on file header 214. If a system time clock is not provided, the user may type the date and time in the fields as indicated.

Returning to the main menu of FIG. 11, the system proceeds to step 218 wherein the file type is written to the file header 214. If a B Save command was selected, the file type is written as a memory image, thus denoting that the data to be stored following the file header is binary data. If the Save command has been selected, the file type is assumed to be a BASIC file and the word BASIC is written to the file header as indicated. In addition, if the Save command was executed, the program routine also interrogates predetermined memory locations to determine the starting address and length of the BASIC file. Such information is provided by most implementations of the BASIC language. When step 218 has been performed, control proceeds to point 2 in the main menu program.

Figure 13:
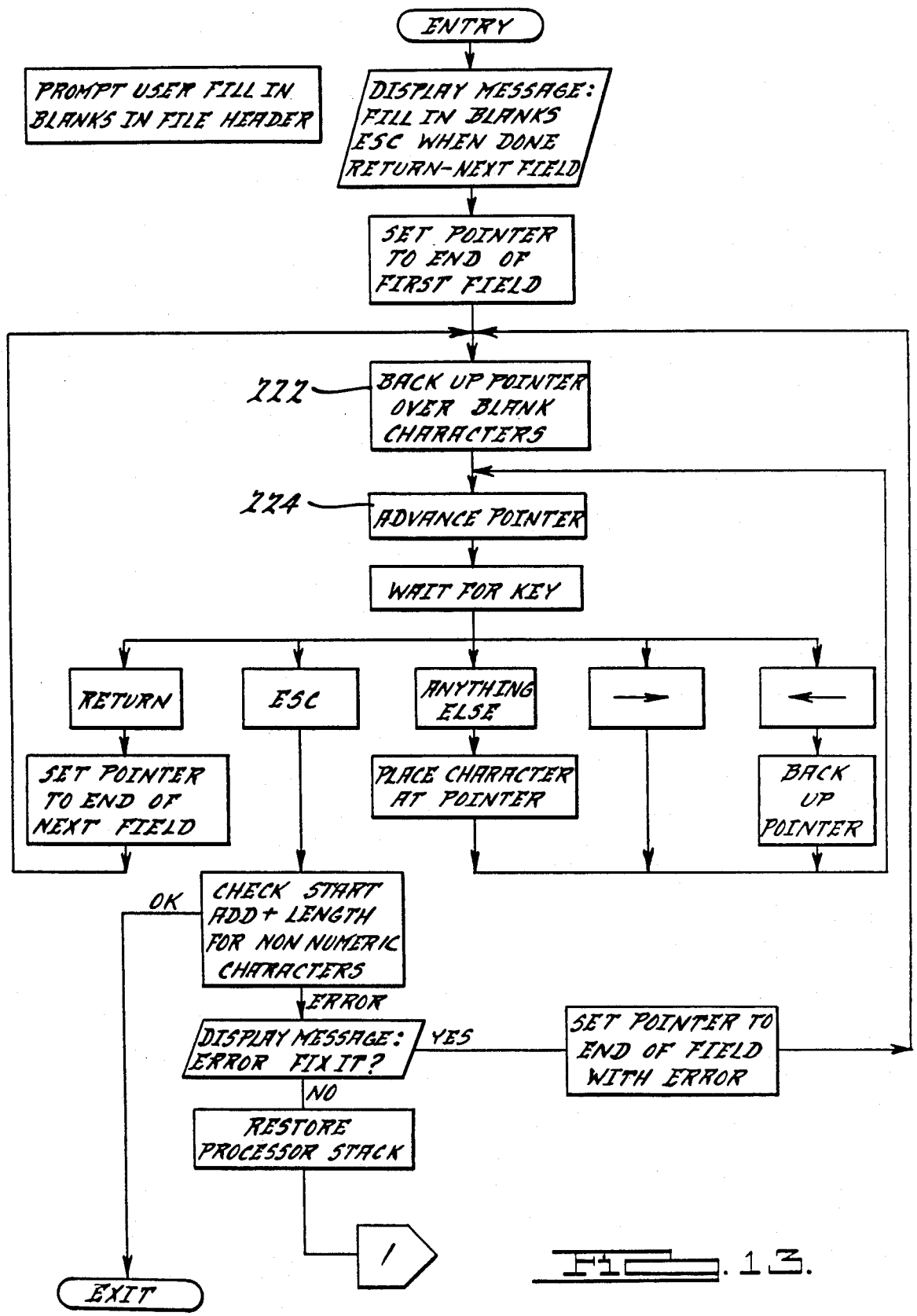
Figure 14:
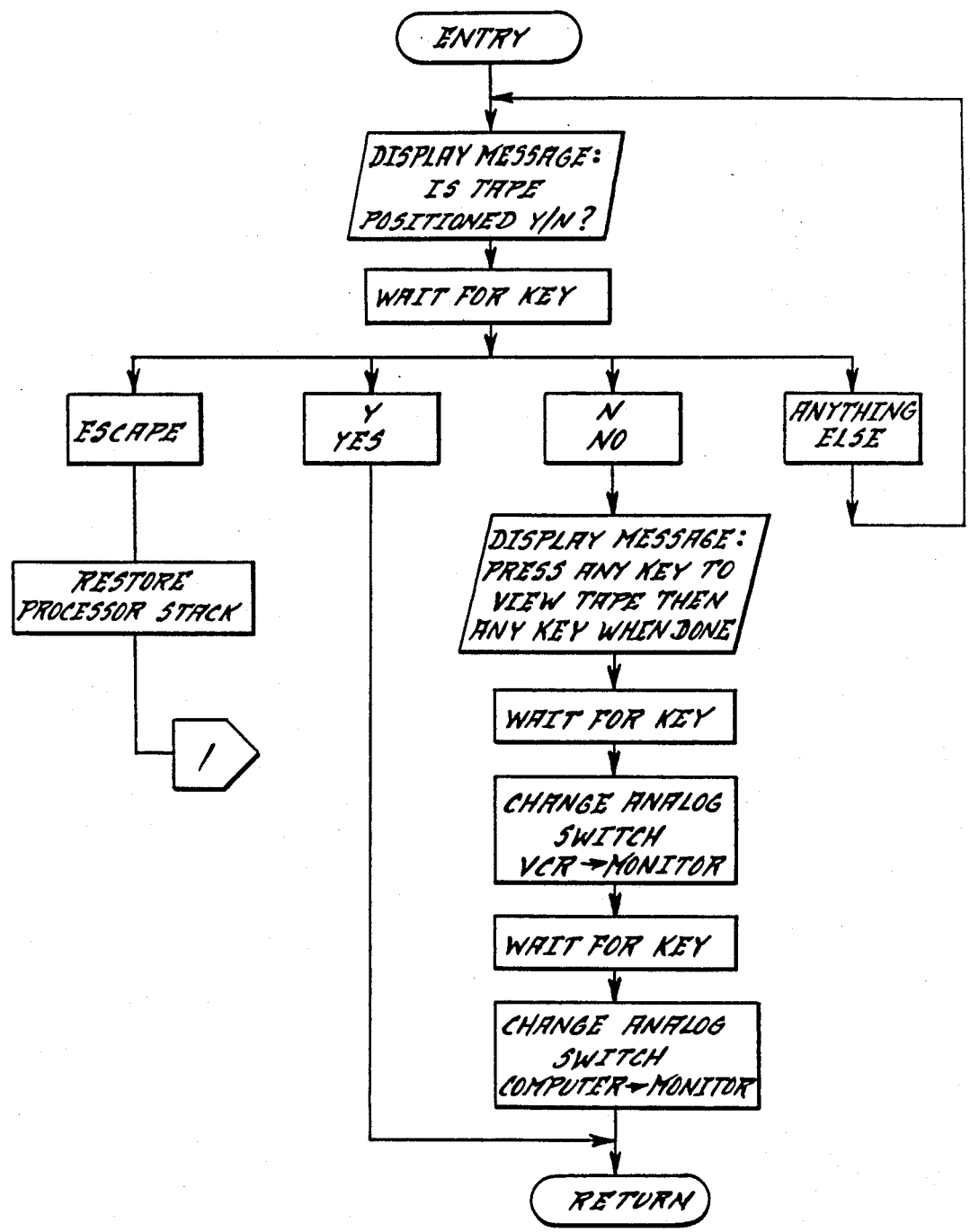

At point 2 the user is next prompted in step 220 to fill in any blanks remaining in file header 214. The details of step 220 are illustrated more completely in FIG. 13. Referring to FIG. 13, the user is prompted to fill in blanks, to hit the return key, to go to the next field and to hit the escape key (ESC) when finished filling in the file header. First, the pointer or cursor is set to the end of the first field and then the pointer or cursor is backed up over any blank characters and advanced one space, where the program waits for a key to be depressed. If the return key is depressed, the pointer or cursor is set to the end of the next field and program control branches back to step 222. If a cursor right key is depressed, the program control branches to the advance pointer step 224. If a cursor left key is depressed, the pointer is backed up and program control resumes with step 224. If an escape key (ESC) is depressed the starting address and length fields are checked for non-numeric characters. If a non-numeric character is detected, an error condition results and the user is prompted to correct the error or return to the main menu. If no error is detected, the subroutine returns control to the main menu at a point following step 220. If anything besides a return key, escape key or left and right cursor movement keys has been depressed, the character depressed is written at the cursor location upon the screen and program control continues with the step 224.

Referring back to FIG. 11, the user is next prompted in step 226 to position and start the tape. This routine is illustrated more fully in FIG. 14. The routine prompts the user to indicate whether the tape is positioned correctly or not. If the escape key is depressed, the main menu selection is aborted and control returns to point 1 of FIG. 11 to display the main menu once again. If a Y or yes is entered by the user, the subroutine returns to its calling point in the main menu. If an N or no is entered by the user, a message is displayed prompting the user to press any key to view the tape then any key when done. The routine waits for a first key to be depressed, then it changes switch 160 to redirect the output of the video recording device to the computer monitor. The routine then waits for a next key to be depressed, whereupon it switches switch 160 back to its default position wherein the video signal from the computer video output device is directed to the monitor. Control then returns to the calling point within the main menu program.

Figures 15, 15A:
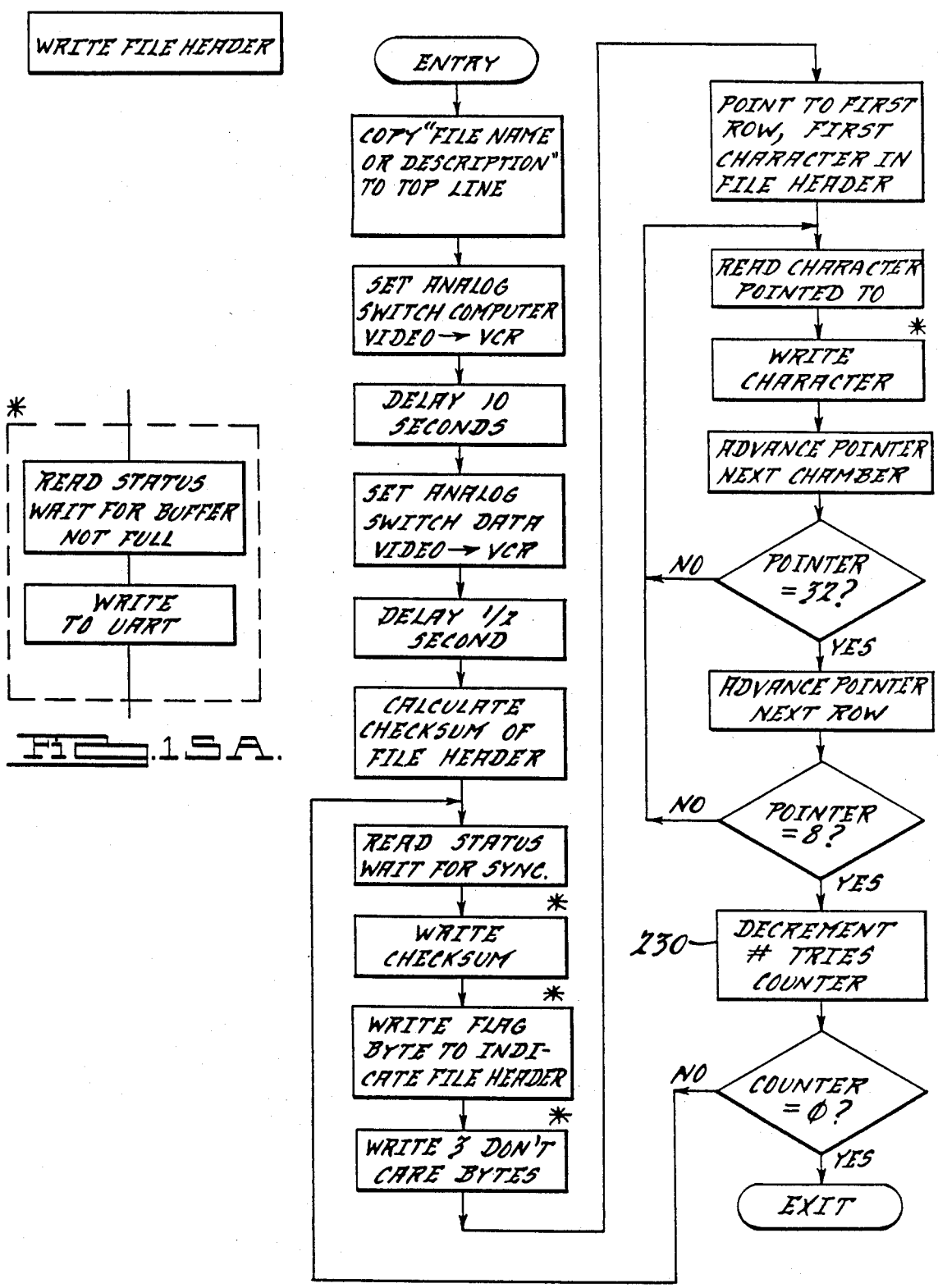

Next a write file header routine 128 is executed. This routine is illustrated in FIG. 15. It is through the use of this write file header routine that the invention places human readable information at the beginning of a stored digital information file, so that the user can review the contents of the video tape or other video recording medium on a monitor or television set, without the intervention of the computer. The human readable file header information is computer system independent, thus the user can review the file headers which describe stored programs or data even if the programs or data have been produced by different or incompatible computer systems. It is therefore possible to store on a single video tape, or other video recording medium, computer information and digital data produced by several incompatible computers.

With reference to FIG. 15 the write file routine first copies the file name or description to the top line or title line of the video monitor or television monitor. This file name or description usually resides within a file control block or other preassigned memory location when the particular file is loaded in the computer's RAM memory. The file name or description remains on the top line or title line even while digital information is being sent from the video recording device. This provides useful reassurance to the user that the correct file is being written or read. Switch 162 is then set to direct computer video to the VCR or video recording device. The program then delays for 10 seconds to permit the viewer to see the complete file header on the video monitor. It will of course be understood that the 10 second delay is not critical, but is merely selected to provide most readers ample time to read the entire file header. Following the 10 second delay, switch 162 is set to direct data video to the VCR or recording device. This step is followed by a non critical one-half second delay. The program then calculates a checksum of the entire file header written to the video recording device. This checksum is based on the ASCII values of both prompts and replys which insures that the checksum will be computer independent.

Next the program interrogates the read status line coupled to buffer 114 and waits for a sync signal. When the sync signal occurs, the checksum calculated earlier is written to the video recording device. FIG. 15A more fully illustrates the presently preferred way in which data is written to the video recording device. As indicated, the read status line is interrogated and the program waits until the buffer is no longer full. Then the instruction is given causing data to be strobed through the UART. In the presently preferred embodiment the hardware determines when the buffer is empty so that data may be strobed through the UART. Alternatively, the same result may be accomplished in software using interrupts, for example.

After the checksum is written a flag byte is next written to indicate the beginning of the file header. The flag byte is written using substantially the same routine as described above in connection with FIG. 15A. After the flag byte is written, three "don't care" bytes are written and the program then successively points to each character in the file header, reading the character pointed to, and writing it to the video recording apparatus. In the presently preferred embodiment the file header comprises eight lines or fields, each field comprising space for up to thirty-two individual characters. Using a pair of nested loops, the program points or steps successively through each of the thirty-two spaces in the first field, and then advances to the next field. Each of the eight fields are successively written in this fashion.

To insure that no data is lost the preferred embodiment writes multiple copies of the file header. This is implemented in software by using a number of tries counter 230. The number of tries counter is preloaded with a starting integer (2 for example). Each pass through the write file header routine decrements the counter by one. When the counter is zero the write file header routine exits to the main menu program which, in turn, calls the write data routine 232. The write data routine is depicted in FIG. 16.

Referring to FIG. 16, the write data routine begins by calculating a checksum of the first 256 byte block of data, for error checking. A number of tries counter is initialized to a preselected number which determines the number of iterations through the write data loop. The read status line is interrogated, waiting for a sync pulse, as more fully indicated in FIG. 16A. The checksum is then written to the video recording medium, followed by a write flag byte, which indicates that data is to follow. The flag byte is also written in accordance with the routine illustrated at FIG. 16A. Next, one or more "don't care" bytes are written to the recording medium in accordance with the routine of FIG. 16A. The write starting address (Hi and Lo bytes) is next written to the recording medium in accordance with the routine of FIG. 16A. A data counter is then initialized to 256, the byte size of the data block being written. In this regard, all data blocks are assumed to be 256 bytes, even partial blocks which may contain a number of blank lines at the tail end thereof. Next, each byte of data is strobed through the UART one byte at a time, beginning at the starting address.

As each byte is written, the data counter is decremented and tested to determine if the entire 256 byte block has been written to the recording medium. If it has, the number of tries counter is decremented and tested. If the number of tries counter has not reached zero, the program branches back through the write data loop, as indicated in FIG. 16, thereby causing multiple copies of the data block to be written to the recording medium. This is done to insure that data can be recovered even if one or more bytes within a given block contain parity errors. Once the number of tries counter has been decremented to zero, program control branches to decrement the most significant byte (MSB) of the byte or word containing the length of the data file being written.

When this file length value, so decremented, reaches negative one, the write data task is complete and a task complete message is displayed. Otherwise the program branches to the entry point of the write data routine, and the entire sequence is repeated. By decrementing the most significant byte of the length word, the write data routine insures that data is always written in full 256 byte blocks. This insures that there will always be a plurality of blank lines at the end of each second frame. Usually there will be 102 blank lines at the end of each second video frame. These blank lines are detected by one shot multivibrator 112 which provides the No Data Flag to buffer 114.

Having thus described the Save and B Save routines, the Load and B Load routines will now be described. Referring to FIG. 11, both the Load and B Load routines begin by prompting the user to position and start the tape, step 226. This step was described above in connection with FIG. 14. Next the file header is read, step 234. Step 234 is depicted in detail in FIG. 17.

Figure 18:
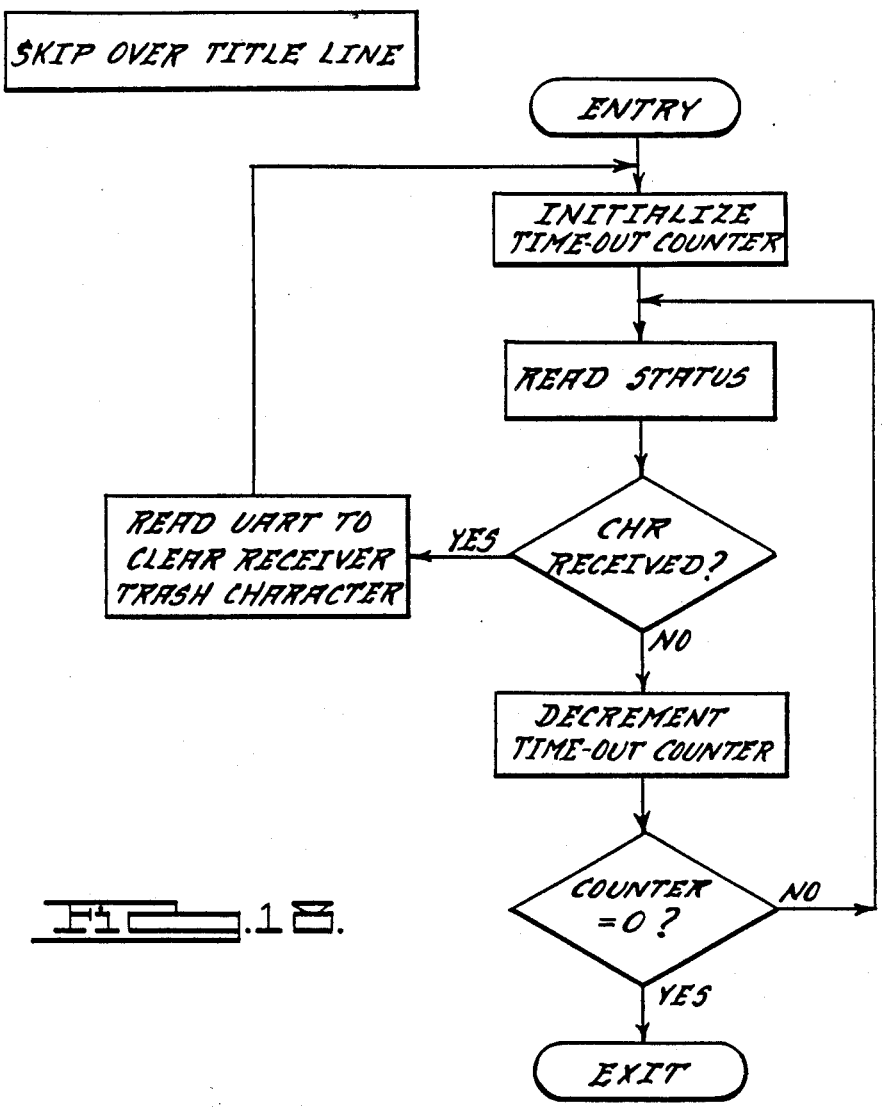

Referring to FIG. 17, the read status line is interrogated waiting for the No Data Flag. When the No Data Flag is set, the program, in step 236, skips over the title line. The routine for skipping over the title line is shown in FIG. 18. When reference to FIG. 18, a time out counter is initialized to a predetermined number, such as 12, and the read status line is interrogated to determine if a character has been received. If a character has been received, it is assumed to be one of the characters in the title line and the UART is instructed to ignore or trash the character. If no character is received (as will occur after the last character of the title line has been read) the time out counter is decremented and tested. If the counter has reached zero, control returns to the read file header routine of FIG. 17. If the counter has not reached zero, the program branches back to the read status interrogation step and the loop continues as described above. By initializing the time out counter to a significantly large value (a value of 8 is usable) time out will occur only if a gap in data occurs. To accomplish this the counter is initialized to a value such that the execution time of the software loop is considerably greater than 63 microseconds (the duration of one video line and one byte of data).

Referring back to FIG. 17, the read file header routine then reads and saves the checksum which was stored on the recording medium on the Save or B Save routines. FIG. 17A illustrates the read sequence in greater detail. In accordance with the read sequence, a time out counter is initialized and the read status line is interrogated to determine if a character is received. If a character has been received, it is read from the UART. If a character has not been received, the time out counter is decremented and tested. If the counter is not zero, control branches to the read status interrogation step. If the time out counter has reached zero, a time out occurs and program control branches to the entry point of the read file header routine. Preferably the time out counter of FIG. 17A is initialized to a sufficiently large value, so that time out occurs after a gap in data occurs which is considerably greater than the duration of two bytes, such as would occur at the end of each second video frame.

After the checksum has been read and saved, the flag byte indicative of the beginning of the file header is next read in accordance with the routine of FIG. 17A. If the Flag byte is found, indicating the beginning of the file header, the next three "don't care" bytes are read and ignored. If the flag byte is not detected, control branches to the entry point of the read file header routine. After the "don't care" bytes have been detected and ignored, a pointer is set to the first character in the first row of the file header. The routine then attempts to read the pointed to character from the UART. If a time out occurs, control branches to the skip over title line step 236. If no time out occurs, the character read from the UART is tested to determine if it contains any errors, such as timing errors or parity errors. A timing error causes control to branch to the entry point of the read file header routine. A parity error causes the program to advance the data pointer to the next character.

If no errors are detected the character is written to computer memory at a location designated for the file header. The pointer is then advanced to the next character and tested to determine whether it is pointing beyond the limit of the 32 character header field. If the limit is detected, the pointer is advanced to the next row and tested to determine whether it is beyond the last line (the eighth line) of the file header. Once all 32 character locations for each of the eight lines of the file header field have been written to computer memory, the checksum of the file header is calculated and compared with the checksum read from the recording medium. If the checksums match, the read file header routine exits and returns control to where it left off in the main menu program. If the checksums do not match, control branches to the entry point of the read file header routine and the entire sequence is repeated.

In the case of the Load command, which is used to load BASIC programs or data files, the file being loaded in checked to determine that it is the proper type of file, i.e. compatible with the BASIC interpreter. In the case of the B Load command the file type is assumed to be a memory image or binary file. Under both Load and B Load commands, the starting address and length of the file are then determined from the information recorded in the file header and control branches to the read data step 236. The read data step 236 is illustrated in detail in FIG. 19.

Figure 19:
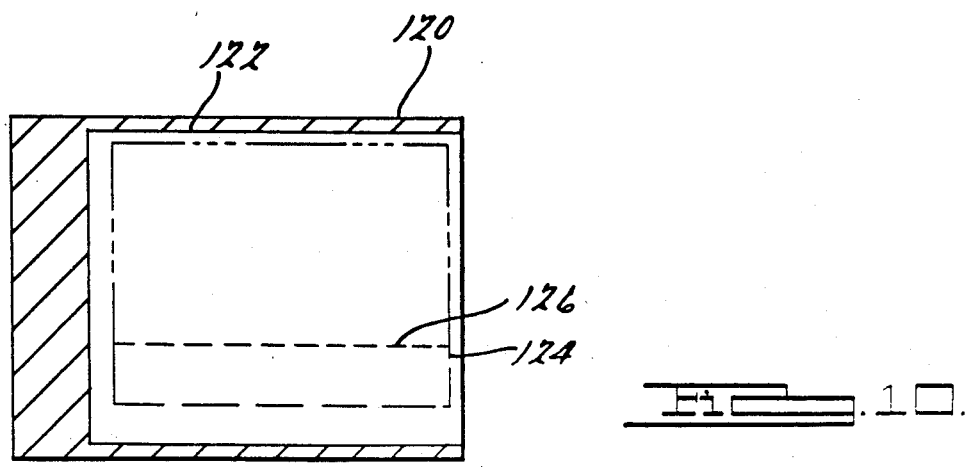

Referring to FIG. 19, the read data routine begins by initializing a byte counter to 256 and the read status line is interrogated while the program waits for a No Data Flag. The routine then skips over the title line in accordance with step 236, described above in connection with FIG. 18. The checksum is then read and saved in accordance with the routine illustrated in FIG. 19A. The routine of FIG. 19A follows substantially the same logical sequence as the routine for reading characters from the file header, shown in FIG. 17A.

Having read and saved the checksum, the program then reads and determines whether a Flag byte follows the checksum. If the Flag byte indicates data is to follow, the "don't care" bytes are read and ignored and the starting address bytes (Hi, Lo) are read and stored in an address counter. Bytes of data are then read from the UART, tested for timing and parity errors and written into RAM memory. The sequence of reading bytes of data from the UART and writing those bytes into successive RAM memory locations proceeds by incrementing the address counter while decrementing the byte counter and the length of file counter. When the length of file counter or the byte counter reach zero, a checksum of the 256 byte data block is calculated and compared with the checksum read from the recording medium. Control then resumes with additional blocks of data being written to RAM memory until the length of file counter reaches zero, whereupon the program returns control to the calling point within the main menu program. If the program is following a Load command, control is transferred to the BASIC interpreter for performing housekeeping functions in the usual fashion.

Should the user wish to browse through the contents of a given video recording medium, such as a video cassette tape, a view tape routine 240 is provided in the main menu program of FIG. 11. The view tape routine first displays a message instructing the user to press any key to view the tape and then to press any key when finished. The routine then waits for a key to be depressed, giving the user time to position and start the tape. In step 242 the routine changes the setting of switch 160, causing VCR video to be directed to the computer monitor. The program then waits for a second key to be depressed, whereupon switch 160 is returned to its default state wherein computer video is directed to the computer monitor. The main menu program also includes an exit routine 244 which restores the CPU registers and machine status and returns control to the computer operating system.

Figure 6:
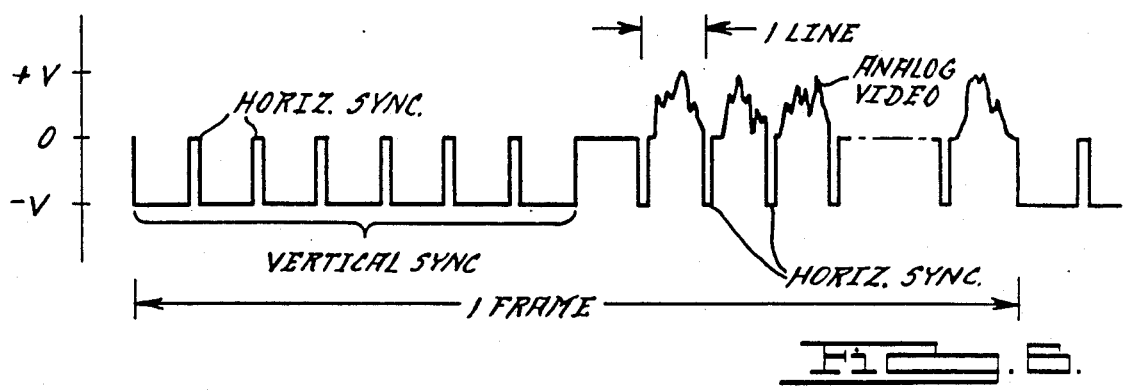
FIG. 6 is a wave form diagram illustrating a typical video signal.

FIG. 6 depicts a typical video signal comprising one video frame. As indicated, each line of analog video information is embedded between horizontal sync pulses. Each video frame, comprising 256 video lines, is embedded between vertical sync pulses. The voltage levels indicated in FIG. 6 are for illustration purposes only, wherein zero volts represents a video black and + V volts represents a video white. It will be understood that these voltages may be referenced to other voltage levels, thus the wave form of FIG. 6 may appear shifted relative to the zero voltage axis. FIG. 7 depicts a typical data video signal comprising one video line. The video data signal comprises a data flag and eight data bits, followed by one parity bit. This data video signal is embedded between horizontal sync pulses as indicated. If color video is implemented, a color burst occurs before the data flag in each video line, in accordance with industry standards. It will again be recognized that the voltage levels indicated in FIG. 7 are merely illustrative, as the data video signal may be referenced to other voltage levels causing the illustrated wave form to be shifted with respect to the zero voltage axis. In contrast to analog video information, the digital data video information assumes only two video voltage states, corresponding to video black and video white voltage levels. In contrast, analog video information also includes a range of grey video levels, as well.

In the foregoing embodiment the human operator is responsible for positioning the recording medium and starting the recording device. In the Save and B Save modes this involves locating where on the cassette tape or other recording medium the program is to be stored and then depressing the record switch to place the recording device in a record mode. With the Load and B Load commands the operator is similarly responsible for positioning the tape or recording medium (using the view tape command if necessary) and then placing the recording device in a playback mode. Video recording devices equipped with fast forward and fast reverse with preview or search capabilities are preferable since the operator can select "search forward" or "search reverse" modes to manually locate a file header and subsequent data file more quickly.

In conjunction with the manual operation described above, the invention also includes an automatic search mode which permits the computer to search in fast forward and fast reverse modes to locate a particular file for writing or reading. In the automatic mode the video recording device may have preview or search capabilities in fast forward and reverse modes, although this is not required. The presently preferred embodiment for implementing an automatic search mode utilizes the audio recording track found on most video recording devices. If necessary to provide sufficient signal strength and pulse definition, the recording device may be modified so that the audio read head is loaded onto the recording medium during fast forward and fast reverse modes. In the alternative, electronic signal amplifying and compensation networks may be used to enhance and refine the periodic tape location markers as they are read by the audio read head.

Figure 20:
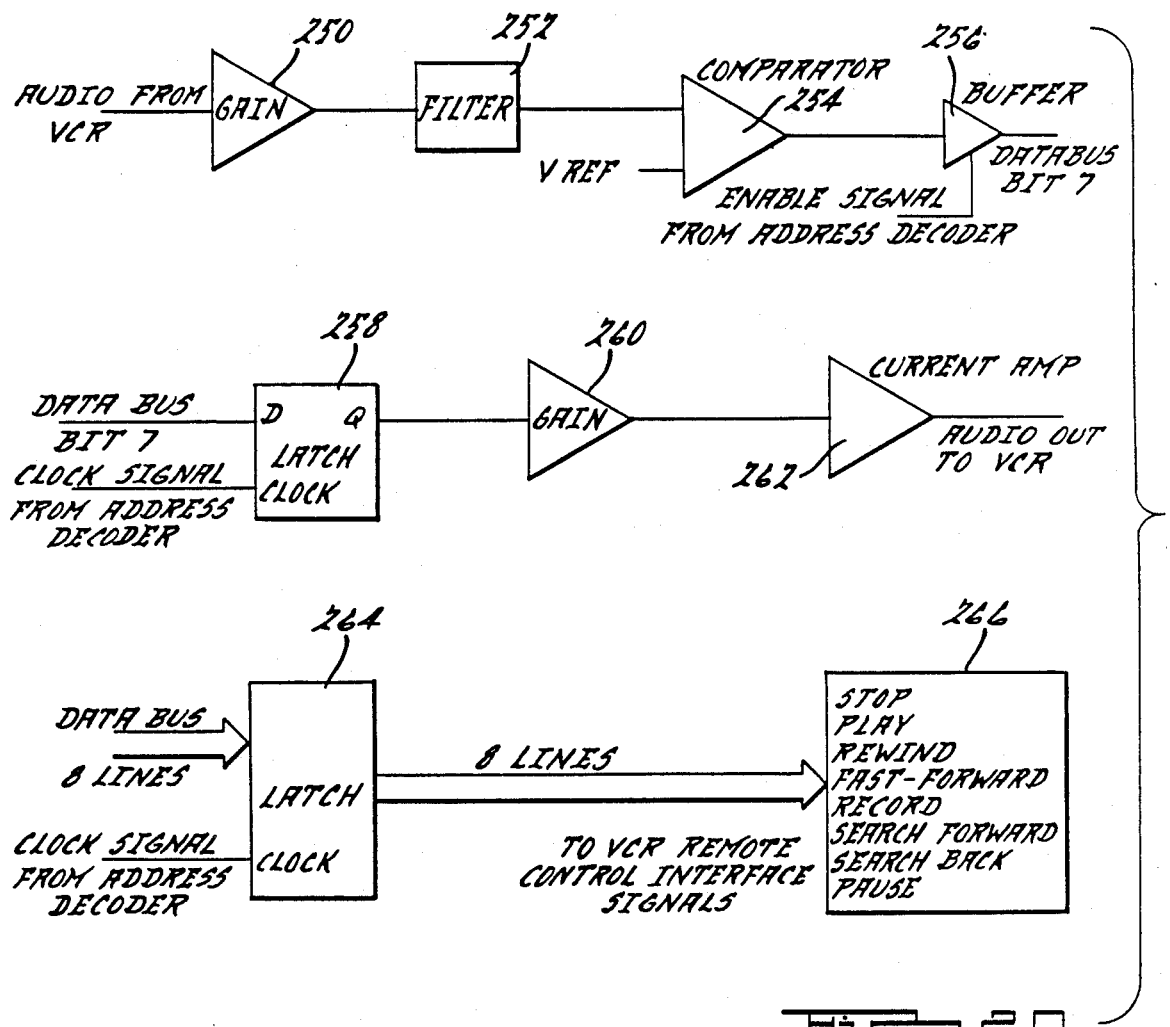
FIG. 20 is a block circuit diagram of the circuit used to implement the autoseek feature of the invention.

FIG. 20 illustrates the electronic circuitry required to implement the automatic search mode of the present invention. The audio signal from the read head of the video recording device is processed through amplifier 250 and filter 252 to provide the required signal strength and frequency content to provide a robust tape location signal. The tape location signal is detected by comparator 254 and latched in buffer 256 for placement on data bus in response to an enable signal from the address decoder 84.

The tape location markers which are detected by the audio read head of the video recording device may be prerecorded at periodic intervals by the tape manufacturer or they may be recorded by the invention. In order to implement the latter a latch circuit 258 is coupled to the local data bus to provide digital pulses in response to data signals on the data bus and in response to clock signals from the address decoder 84. Tape location signals may be generated using one of the data bus lines. For purposes of illustration, bit 7 of the local data bus is used to provide these tape location markers. The output of latch 258 is processed through amplifier 260 and current amplifier 262 to provide a signal of significant energy to drive the write head of the video recording device. Under computer control via the data bus and address decoder, the invention may record periodic and sequentially numbered tape location markers. As an alternative to periodic and sequentially numbered markers, the invention may instead assign different numbers to each of the files stored on the recording medium as a means of distinguishing between and locating individual files. As a second alternative, the invention may record all of the characters in the title line of each file header onto the audio track as a means of distinguishing between and locating individual files.

The automatic search mode futher includes a latch circuit 264 through which the computer communicates with the remote control interface of the video recording device. Latch 264 may be coupled via hard wire or radiant energy link to the function controller 266 of the video recording device. The function controller circuit 266 may be implemented using commercially available hardware which accompanies video tape recording devices with remote control capability. Latch 264 is coupled to the local data bus and receives clock signals from address decoder 84.

Figure 27:
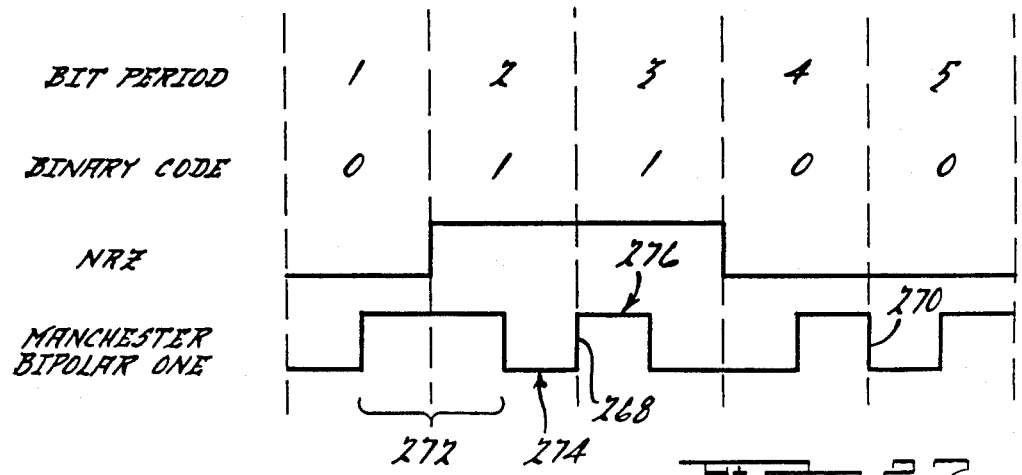
FIG. 27 is a wave form diagram comparing the non-return-to-0 code with the Manchester bipolar one code used to implement the autoseek tape position markers.

The fast forward and fast rewind modes of most video tape recorders do not employ capstans to maintain a constant tape speed during fast forward and fast rewind. In general, the tape speed during fast forward and fast rewind will vary in accordance with the diameter of the tape wound upon the take-up reels at any given point in time. To eliminate inaccuracy due to non-uniform tape speed, the presently preferred embodiment of the invention uses a Manchester code to record the periodic tape position markers and file location markers. The Manchester code has the advantage of being self-clocking, and therefore is immune to the inaccuracies induced by varying tape speeds. FIG. 27 compares the widely used nonreturn-to-zero code (NRZ) with the Manchester code for the binary code sequence, 01100. Strictly speaking, the present invention utilizes the bipolar one component of the Manchester II code, also known as Biphase-L code. As illustrated in FIG. 27, the Manchester bipolar one code changes state in the middle of the bit period, wherein a transition from Lo to Hi represents a binary "0", and the transition from Hi to Lo represents a binary "1". When two like binary digits occur in sequence, as the binary 1's in bit periods 2 and 3 or as the binary 0's in bit periods 4 and 5, an intermediate return transition is made between bit periods as indicated at 268 and 270. The mid bit transition in each data cell provides the Manchester code with an effective error detection scheme. If noise produces a logic inversion in the data cell such that there is no transition, an error indication is given, and synchronization must be reestablished.

Furthermore, the Manchester code is a self-clocking code. The clock in serial data communication defines the position of each data cell. For example, the interval 272 between the transitions in bit periods 1 and 2 establishes the clock time for the data samples 274 and 276 immediately following. In the presently preferred embodiment transitions are detected by sampling both sides of the midpoint where data transitions are expected to occur. In other words, each data transition is expected to occur at approximately the half way point between the beginning and ending of any bit period. Samples are taken at the one-quarter and three-quarter clock times within each bit period.

The algorithms for writing and reading the above Manchester code are illustrated in the flow charts of FIGS. 21 through 26. FIG. 21 depicts the write sequence for writing a word to the VCR audio track or the like in Manchester II format. If the word to be written is the first word in a sequence the program first writes eight "0" bits to the recording medium to provide a plurality of transitions from which a clock can be extracted upon playback. Next parity of the word to be written is determined and a sync pattern is written in accordance with the routine of FIG. 21a.

The write sync sequence begins by setting the output bit (bit 7 in FIG. 20) Lo. Next a delay for a one and half bit time is executed, whereupon the output bit is set Hi. Finally, a second one and one half bit time delay is executed whereupon the write sync routine returns to the main program of FIG. 21. The word to be written is rotated so that the least significant bit (LSB) is rotated into the carry bit location. The carry bit location is then tested to determine whether it holds a 0 or a 1. In accordance with this determination either a 0 bit or a 1 bit is written as illustrated in FIGS. 21b and 21c. When all of the bits have been rotated into the carry bit location and written, the parity bit is then written and the write sequence is terminated. The routine for writing a "0" bit is indicated in FIG. 21b. The output bit is first set Lo and a delay for a one half bit time is executed. The output bit is then set Hi and another delay for a one half bit time is executed. The sequence for writing a "1" bit begins by setting the output bit Hi followed by a delay for a one half bit time. Next the output bit is set Lo, followed by another one half bit time delay.

Figure 22:
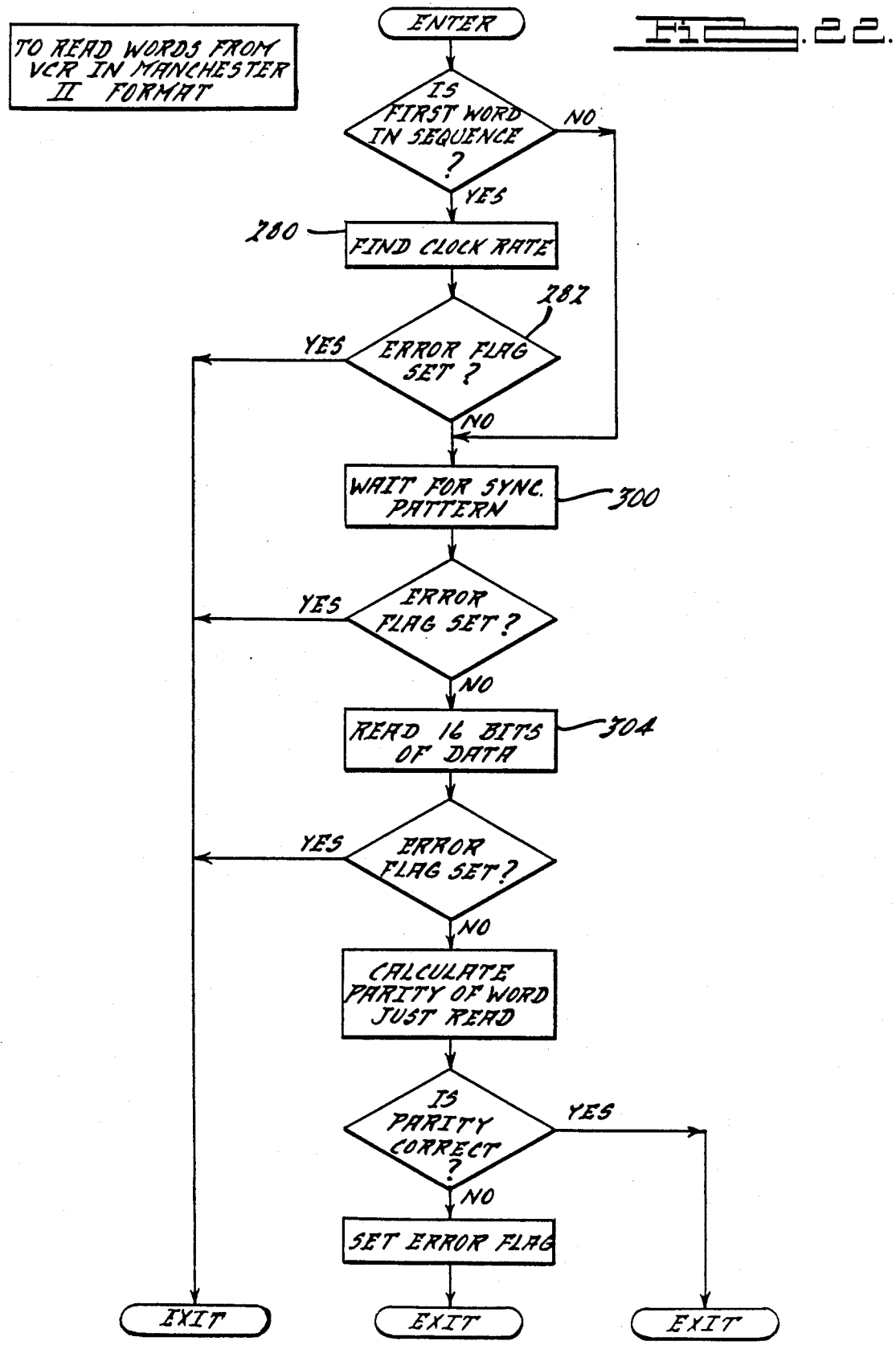

The sequence for reading words from the VCR in Manchester II format is indicated in FIG. 22. The routine begins by testing to determine whether the incoming word is the first word in sequence. If it is, the clock rate is determined in step 280 and the error flag is tested for exiting from the routine if the error flag is set. If the incoming word is not the first word in the sequence the routine branches around the clock determination step 280 and error flag test 282.

Figure 23:
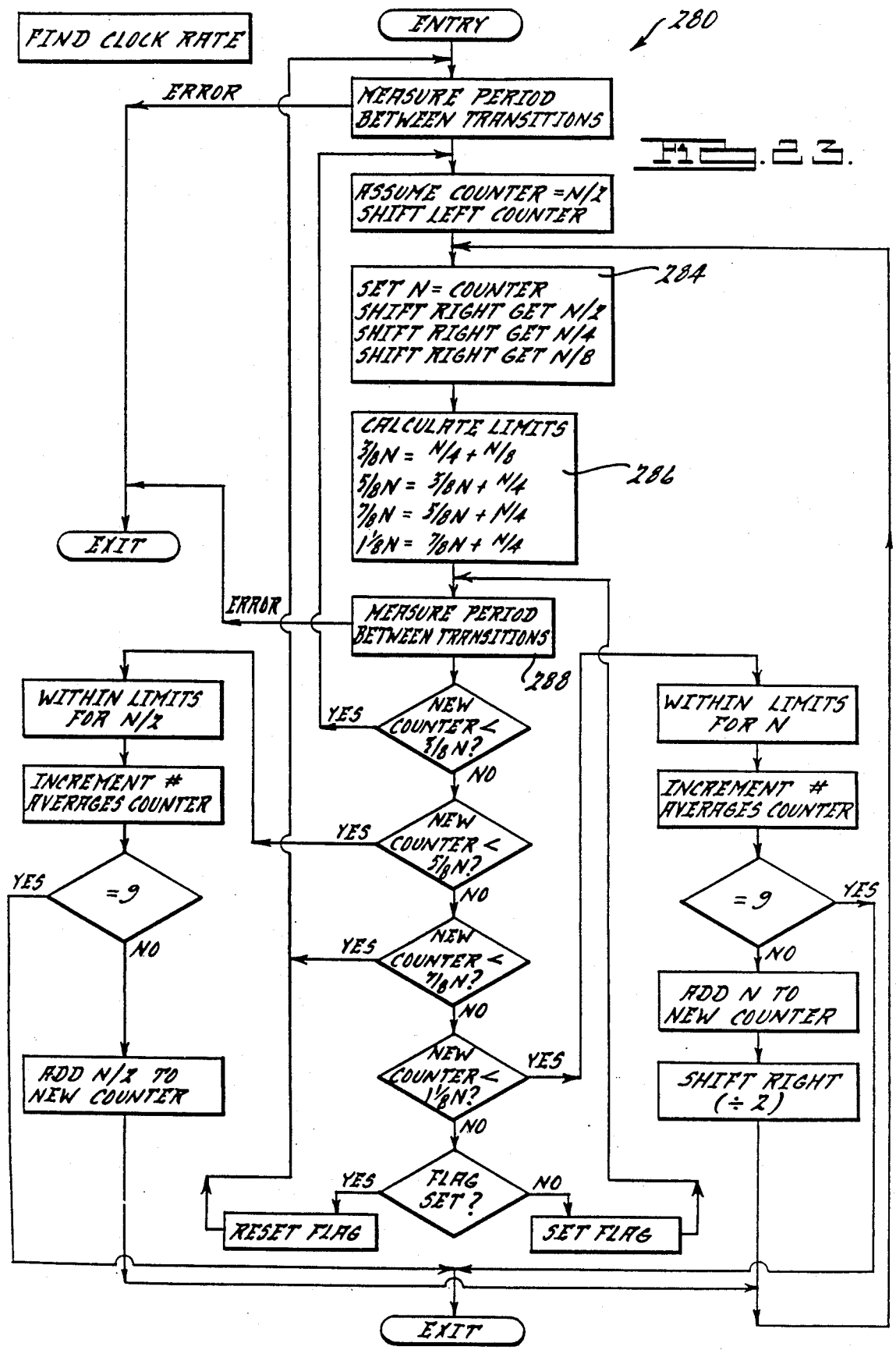

FIG. 23 illustrates the sequence of steps for finding the clock rate, step 280. First the period between transitions is measured and assumed to represent N/2 (one half bit time). The counter containing the measured period is then sifted left, thereby multiplying its value by two. In the next step 284 the counter is shifted right three times to determine the values for N/2, N/4 and N/8. Limits are then calculated as indicated in step 286. The period between transitions is then again measured at step 288 and the routine goes through a series of tests to determine whether the newly measured period in the counter is less than ⅜ N, ⅝ N, ⅞ N, or 1⅛ N. If the new counter value is less than ⅜ N control loops back to step 283 where the new counter value is assumed to be N/2.

If the new counter value is ⅝ N the counter is determined to be within limits for N/2 and a counter recording the number of averages is incremented. If the number of averages equal nine the clock rate has been determined and the routine returns to the read program of FIG. 22. If the number of averages does not equal nine, the counter value is assumed to be N/2 and the program branches back to step 284. If the new counter is less than ⅞ N the value is rejected and the program branches back to the starting point of routine 280. If the new counter value is less than 1⅛ N it is within the limits for N. In this instance the number of averages counter is incremented and tested to determine if nine averages have been made. If nine averages have been made the program returns to the calling point within the read routine of FIG. 22. If the number of averages is not nine the value for N is added to the new counter and shifted right (divided by two), whereupon the program loops back to step 284. In testing the number of averages counter the value nine is used to accommodate the case where a sixteen bit binary number of alternating ones and zeros occurs as an input word (101010...). With this alternating sequence of ones and zeros there are eight transitions and thus nine averages are used.

Figure 24:
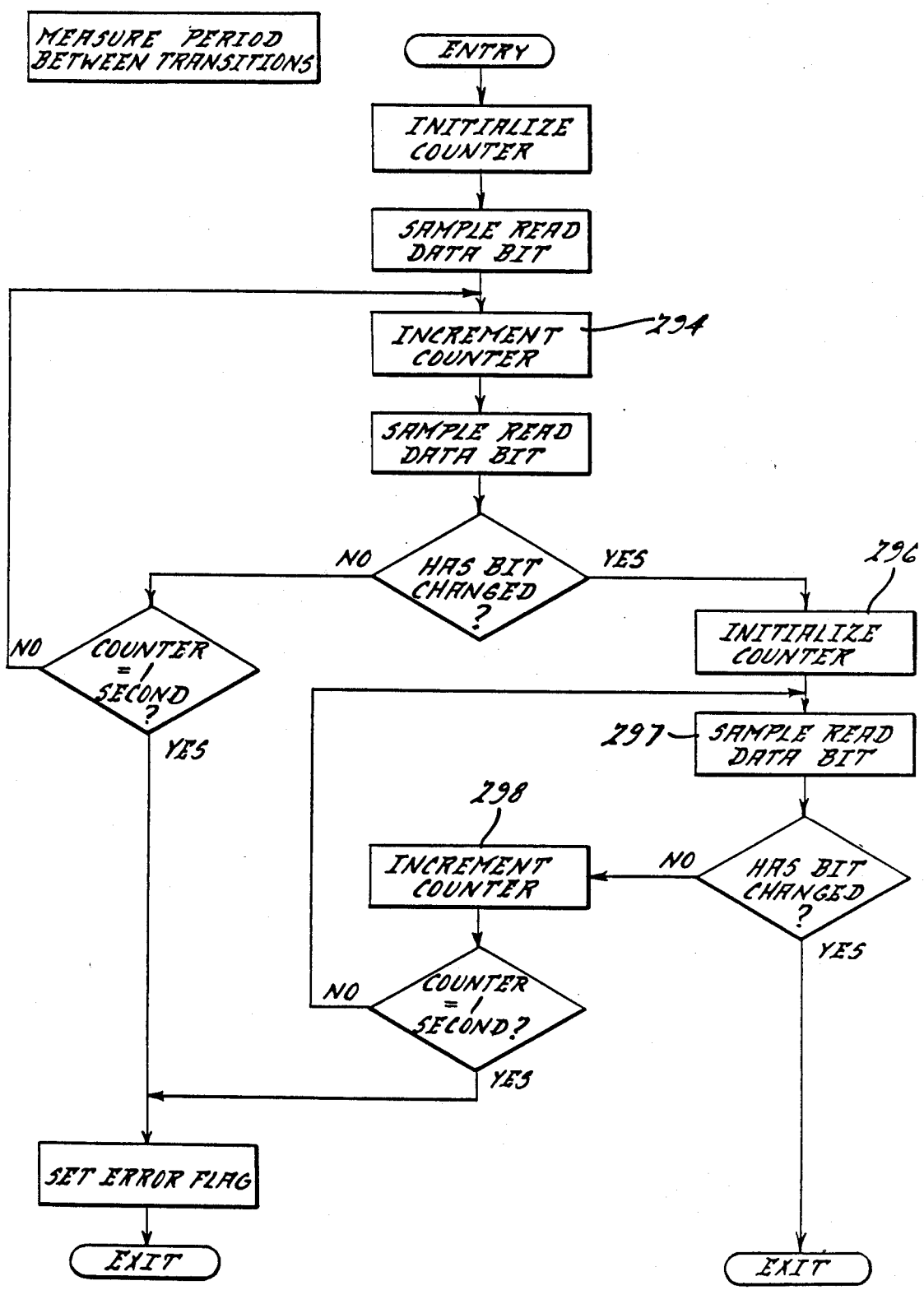

The routine for finding the clock rate several times calls a routine for measuring the period between transitions. This routine is illustrated in FIG. 24. It begins by initializing a counter and sampling the incoming data bit. The counter is then incremented and the data bit is again sampled, followed by a test to determine if the sampled bit has changed. If it is has not changed, the counter is tested to determine if one second has elapsed. If one second has not elapsed control loops back to the increment counter step 294 and a second interation is made. If one second has elapsed an error flag is set and the measuring routine exits to the calling point in the clock rate determining program of FIG. 23. If the bit has changed between successive samples the counter is initialized, in step 296, and the actual time period between transitions is measured. This is accomplished by again sampling the data bit and testing to determine whether it has changed from the previous sample. If it has not changed the counter is incremented in step 298 and the counter is tested to determine whether one second has elapsed. If one second has not elapsed control returns to step 297 where another sample of the data bit stream is made. If one second has occurred an error condition is detected, an error flag is set, and control exits to the calling point of the clock rate determining routine of FIG. 23. When a bit change has been detected between successive samples control returns to the calling point with the counter containing a value representing the measured time period between transitions.

Figure 25:
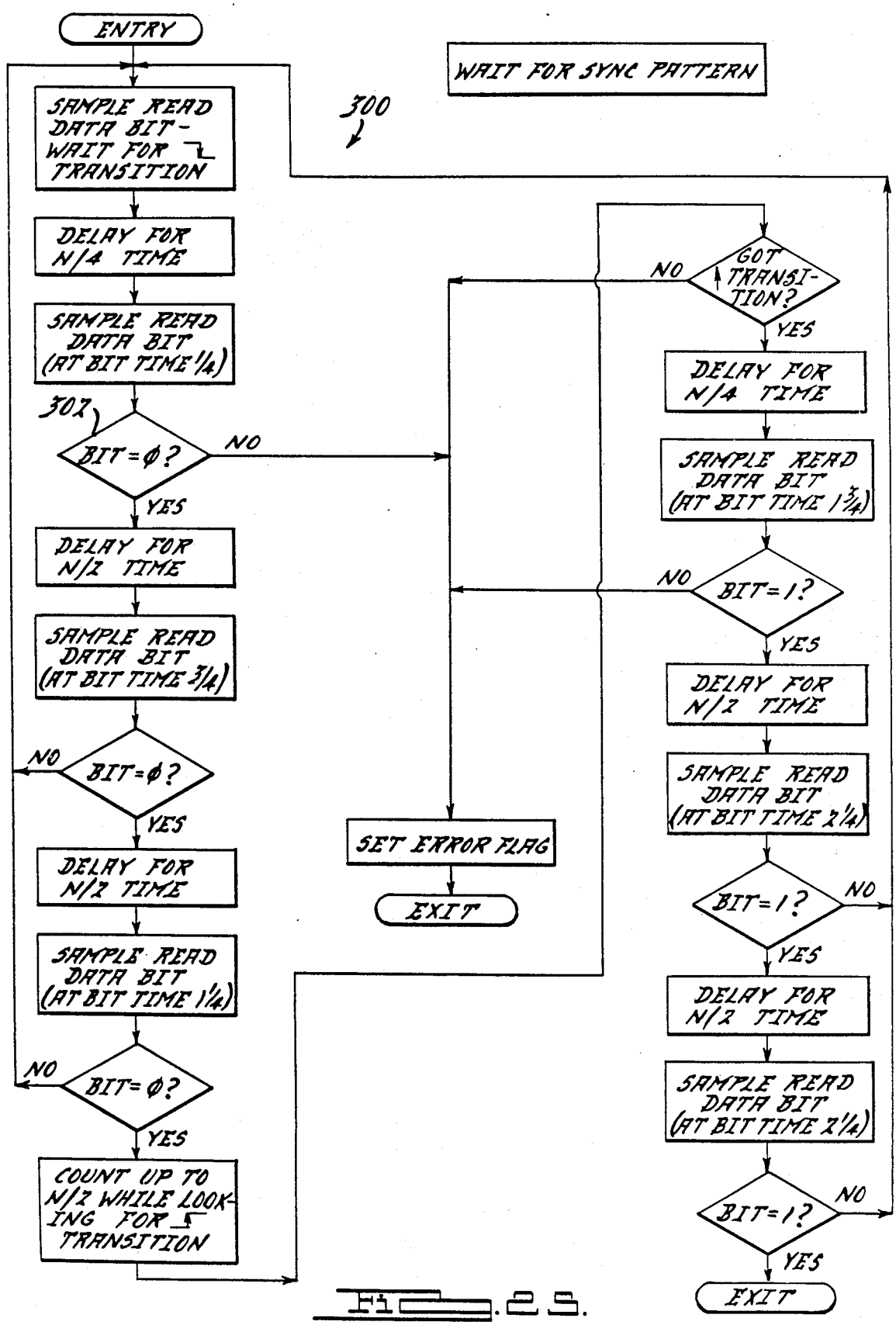

Once the clock rate has been determined and the error flag tested, steps 280 and 282, the program then waits for the sync pattern, step 300. The wait for sync pattern routine is shown in FIG. 25. This routine samples the incoming data stream and waits for downward-going transition. When such a transition occurs a delay for N/4 is executed and the data stream is then again sampled (at bit time one-quarter). The bit is then tested to see if it is at a logical Lo "0" state. If it is not, an error flag is set and the routine exits. If it is at a "0" state a delay for N/2 is executed and another sample of the data stream is taken (at bit time three-quarter). The bit is again tested to determine if it is at a logical Lo or "0" state. If it is not at a logical Lo state control branches to the entry point of the wait for sync pattern routine. If the bit is at a logical Lo or "0" state another N/2 delay is executed and another sample of the data bit is taken (at bit time one and one-quarter). The bit is again tested to determine if it is still at a logical Lo state. If it is not, control branches to the starting point at the wait for sync pattern routine. If the bit is at a logical Lo or "0" state the program counts up to an additional N/2 time period while looking for an up-going transition. If an up-going transition is not detected control branches to the bit testing step 302. If an up-going transition is detected a delay for N/4 is executed and a sample of the data bit is taken at bit time one and three-quarters. The bit is tested to determine if it is at a logical Hi or "1" level. If it is not at a logical Hi level an error flag is set and the routine exits. If it is at a logical Hi level a delay for N/2 is executed and another sample of the data bit is taken (at bit time two and one-quarter). The bit is then again tested to determine if it remains at a logical Hi or "1" state. If it is not at a logical Hi state control branches to the entry point of the wait for sync pattern routine. If the bit is at a logical Hi or "1" state a delay for N/2 is executed and another sample of the data bit is taken (at bit time two and one-quarter). The bit is again tested and if it is not at a logical Hi or "1" state control branches to the starting point of the wait for sync pattern routine. If the bit is at a logical Hi or "1" state, the sync pattern has been detected and the wait for sync pattern exits to the calling routine of FIG. 22.

Figure 26:
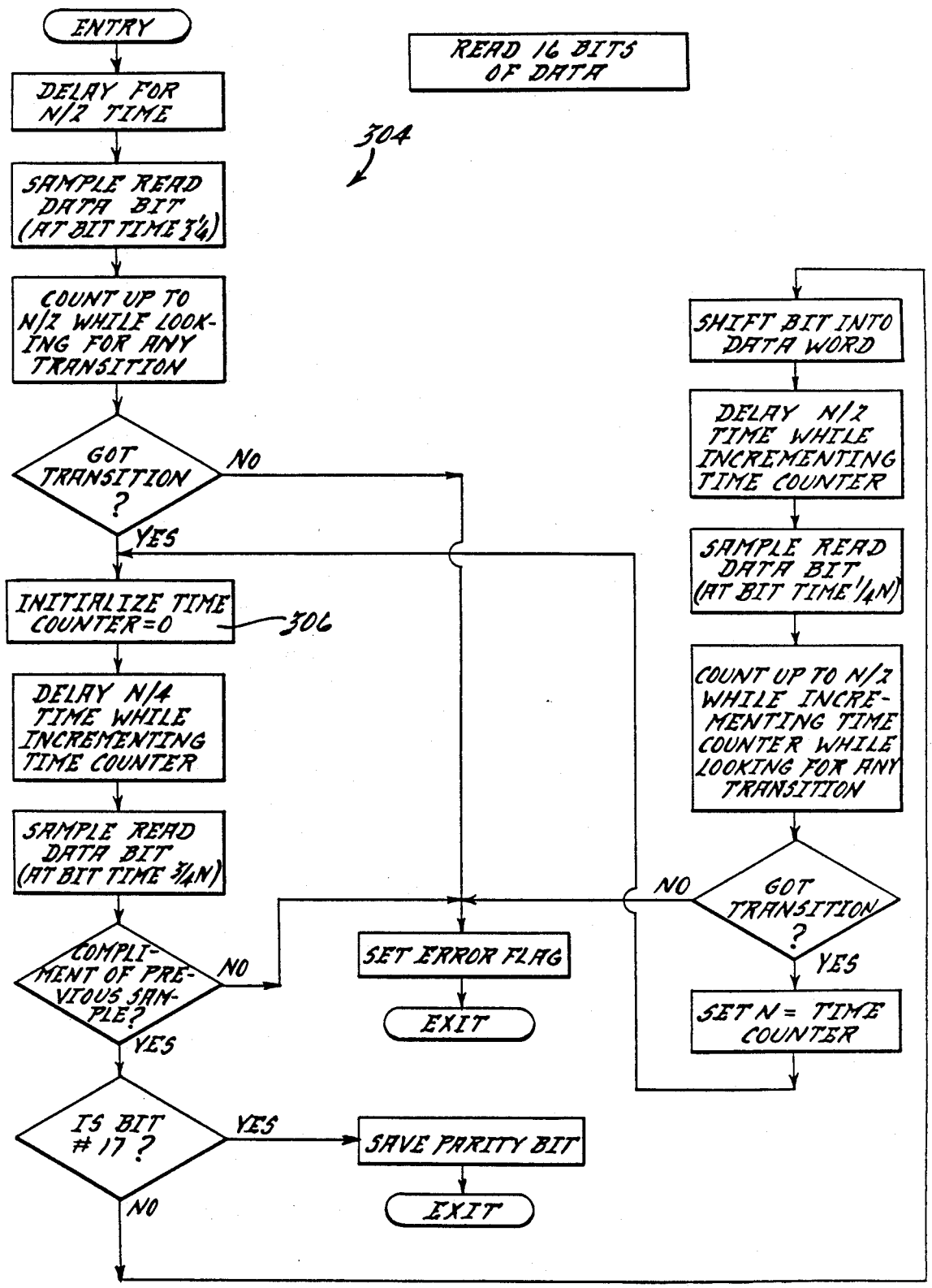

Returning to FIG. 22, following the wait for sync pattern step 300 the error flag is tested, and if it is not set sixteen bits of data are read in step 304. Step 304 is detailed in FIG. 26. Referring to FIG. 26 the reading of sixteen bits of data is accomplished by delaying for a time equal to N/2 and then sampling the data bit stream. Due to the cumulative effect of previous delays this sample is taken at bit time three and one-quarter. The routine then counts for a time equal to N/2 while looking for a transition. If no transition is detected an error flag is set and the routine exits to the calling point at step 304 in FIG. 22. If a transition is detected a counter is initialized to zero and a delay of N/4 is executed while incrementing the counter. The data bit stream is again sampled (at bit time three-quarter N) and this sample is compared with the previous sample to determine if they are complements of one another. If the two samples are not complements an error flag is set and the routine exits. If the two data samples are complements the routine determines if the last sampled bit is bit number seventeen (the parity bit of a sixteen bit word). If the last sampled bit is bit seventeen this parity bit is saved and the routine exits to the calling point, step 304 in FIG. 22. If the last sampled bit is not bit seventeen, it is shifted into the data word. This data word may represent a location in memory (such as two eight bit bytes in memory) where the sixteen bits of data are returned via the operation of this routine. After shifting the bit into the data word a delay of N/2 is executed while incrementing the time counter. Another sample is then taken at bit time one-quarter N. The program counts up to N/2 while incrementing the time counter and while looking for a transition. If a transition is detected, the bit time N is set equal to the value in the time counter and control loops back to step 306 to sample and shift another bit into the data word.

Returning to FIG. 22, once sixteen bits of data have been read in step 304 (or once the program returns from step 304 with error flags set) the error flag is tested and if not set, the parity of the sixteen bit word just read is calculated. If the parity is not correct an error flag is set and the routine exits. If the parity is correct the routine exits without setting the error flag.

While the algorithm for reading Manchester code is presently implemented in software, the automatic search feature may also be implemented using hardware to read the Manchester code. A hardware embodiment may, for example, be constructed using a UART for parallel to serial and serial to parallel conversion, and using a Manchester encoder-decoder integrated circuit such as an HD-15530 manufactured by Harris Corporation.

While the preferred embodiments of this invention have been illustrated and described in detail, it will be apparent that various modifications as to the details of construction and design may be made without departing from the spirit of the invention or the scope of the following claims.

We claim:

1. An apparatus for retrieving serial digital information which has been serially stored as a video signal on a video recording device, wherein said digital information has been stored a plurality of times to define at least a first block and a second block each block individually representing the same digital information, the recording device having an output for providing said video signal, and using a computer system having a processing unit for processing digital information through a parallel data channel, comprising:

means couplable to said output of said video recording device for extracting said serial digital information from said video signal;

serial to parallel conversion means coupled to said extracting means for receiving said serial digital information and converting it into a parallel digital signal comprising a plurality of data words, each word including at least one parity bit;

buffer means coupled to said serial to parallel conversion means for receiving said parallel digital signal and for storing at least one of said blocks, and stored block comprising a predetermined number of data words in a predefined ordered relationship;

control means coupled to said processing unit of said computer system and responsive to said conversion means for checking the integrity of each data word based on said parity bit and for storing an indication of the integrity of each data word so checked;

checksum generating means coupled to said processing unit of said computer system for deriving a checksum value from the data words stored in said buffer means and for comparing said value to a predefined value; and means coupled to said processing unit of said computer system and responsive to said checksum means for causing said second block to be received through said serial to parallel conversion means if said checksum value does not match said predetermined value, said second block comprising a predetermined number of data words in a predefined ordered relationship;

wherein said means coupled to said processing unit, in the event said checksum value does not match said predetermined value, uses said second block and said stored indication of the integrity at least in part to ascertain said digital information.

* * * * *

UNITED STATES PATENT AND TRADEMARK OFFICE
CERTIFICATE OF CORRECTION

PATENT NO. : 4,839,745

DATED : June 13, 1989

INVENTOR(S) : Robert J. Tindall

It is certified that error appears in the above-identified patent and that said Letters Patent is hereby corrected as shown below:

Column 1, line 41, delete "work" and insert therefor -- word --.

Column 7, line 61, delete "included" and insert therefor -- includes --.

Column 7, line 68, between "line" and "local" insert -- to --.

Column 9, line 6, between "of" and "television" insert -- a --.

Column 9, line 20, delete "area" and insert therefor -- areas --.

Column 9, line 68, delete "lines" and insert therefor -- line --.

Column 10, line 1, between "will" and "be" insert -- not --.

Column 11, line 18, delete "of" and insert therefor -- or --.

Column 13, line 7, delete "128" and insert therefor -- 228 --.

Column 13, line 31, delete "useful" and insert therefor -- helpful --.

Column 15, line 14, delete "When" and insert therefor -- With --.

Column 16, line 22, delete "in" and insert therefor -- is --.

Column 19, line 35, between "Next" and "parity" insert -- the --.

UNITED STATES PATENT AND TRADEMARK OFFICE
CERTIFICATE OF CORRECTION

PATENT NO. : 4,839,745

DATED : June 13, 1989

INVENTOR(S) : Robert J. Tindall

It is certified that error appears in the above-identified patent and that said Letters Patent is hereby corrected as shown below:

Column 20, line 5, delete "sifted" and insert therefor -- shifted --.

Column 20, line 48, delete "interation" and insert therefor -- iteration --.

Column 22, line 56, delete "and" (2nd occurrence) and insert therefor -- said --.

Signed and Sealed this

Twenty-ninth Day of May, 1990

Attest:

HARRY F. MANBECK, JR.

Attesting Officer

Commissioner of Patents and Trademarks